US012454720B2

(12) United States Patent
MacDonald et al.

(10) Patent No.: US 12,454,720 B2
(45) Date of Patent: Oct. 28, 2025

(54) METHODS AND SYSTEMS FOR MULTIPLEX ANALYSIS

(71) Applicant: ChromaCode, Inc., Carlsbad, CA (US)

(72) Inventors: Christopher MacDonald, Carlsbad, CA (US); Aditya Rajagopal, Carlsbad, CA (US); Dominic Yurk, Carlsbad, CA (US)

(73) Assignee: ChromaCode, Inc., Carlsbad, CA (US)

( * ) Notice: Subject to any disclaimer, the term of this patent is extended or adjusted under 35 U.S.C. 154(b) by 12 days.

(21) Appl. No.: 17/047,160

(22) PCT Filed: Apr. 16, 2019

(86) PCT No.: PCT/US2019/027751
§ 371 (c)(1),
(2) Date: Oct. 13, 2020

(87) PCT Pub. No.: WO2019/204357
PCT Pub. Date: Oct. 24, 2019

(65) Prior Publication Data
US 2021/0254147 A1 Aug. 19, 2021

Related U.S. Application Data

(60) Provisional application No. 62/659,025, filed on Apr. 17, 2018, provisional application No. 62/659,027, filed on Apr. 17, 2018, provisional application No. 62/693,754, filed on Jul. 3, 2018, provisional application No. 62/753,782, filed on Oct. 31, 2018, (Continued)

(51) Int. Cl.
C12Q 1/68 (2018.01)
C12Q 1/6851 (2018.01)
C12Q 1/686 (2018.01)

(52) U.S. Cl.
CPC .......... *C12Q 1/6851* (2013.01); *C12Q 1/686* (2013.01)

(58) Field of Classification Search
None
See application file for complete search history.

(56) References Cited

U.S. PATENT DOCUMENTS

| 5,079,351 A | 1/1992 | Sninsky et al. |
| 5,538,848 A | 7/1996 | Livak et al. |
| 5,618,711 A | 4/1997 | Gelfand et al. |

(Continued)

FOREIGN PATENT DOCUMENTS

| CN | 1172530 A | 2/1998 |
| CN | 1936019 A | 3/2007 |

(Continued)

OTHER PUBLICATIONS

Miotke et al. (Anal Chem, 2014, 86, 2618-2624) (Year: 2014).*

(Continued)

*Primary Examiner* — Stephanie K Mummert
(74) *Attorney, Agent, or Firm* — Sheppard Mullin Richter & Hampton LLP

(57) ABSTRACT

The present disclosure provides methods and compositions for multiplex quantitation. In some aspects, methods and compositions are provided for quantitation of nucleic acid targets from a biological sample. The disclosed methods may be useful in identifying or detecting genetic abnormalities from a subject.

17 Claims, 19 Drawing Sheets

Related U.S. Application Data provisional application No. 62/804,574, filed on Feb. 12, 2019.

(56) References Cited

U.S. PATENT DOCUMENTS

| | | |
|---|---|---|
| 5,677,152 A | 10/1997 | Birch et al. |
| 5,723,591 A | 3/1998 | Livak et al. |
| 5,773,258 A | 6/1998 | Birch et al. |
| 5,789,224 A | 8/1998 | Gelfand et al. |
| 5,804,375 A | 9/1998 | Gelfand et al. |
| 5,834,203 A | 11/1998 | Katzir et al. |
| 5,876,930 A | 3/1999 | Livak et al. |
| 5,882,856 A | 3/1999 | Shuber |
| 5,928,862 A | 7/1999 | Morrison |
| 5,948,360 A | 9/1999 | Rao et al. |
| 5,981,180 A | 11/1999 | Chandler et al. |
| 5,994,056 A | 11/1999 | Higuchi |
| 6,030,787 A | 2/2000 | Livak et al. |
| 6,103,463 A | 8/2000 | Chetverin et al. |
| 6,127,155 A | 10/2000 | Gelfand et al. |
| 6,171,785 B1 | 1/2001 | Higuchi |
| 6,248,526 B1 | 6/2001 | Weimer |
| 6,258,569 B1 | 7/2001 | Livak et al. |
| 6,379,888 B1 | 4/2002 | Nadeau et al. |
| 6,534,266 B1 | 3/2003 | Singer |
| 6,534,274 B2 | 3/2003 | Becker et al. |
| 6,548,259 B2 | 4/2003 | Ward et al. |
| 6,642,062 B2 | 11/2003 | Kauvar et al. |
| 6,893,875 B2 | 5/2005 | Tsuji et al. |
| 7,070,962 B1 | 7/2006 | Ryncarz |
| 7,101,663 B2 | 9/2006 | Godfrey et al. |
| 7,141,377 B2 | 11/2006 | Gelfand et al. |
| 7,348,141 B2 | 3/2008 | French et al. |
| 7,385,043 B1 | 6/2008 | Kramer |
| 7,410,764 B2 | 8/2008 | Gocke et al. |
| 7,413,708 B2 | 8/2008 | Mayrand |
| 7,473,767 B2 | 1/2009 | Dimitrov |
| 7,507,575 B2 | 3/2009 | Bedingham et al. |
| 7,575,864 B2 | 8/2009 | Bedzyk et al. |
| 7,667,024 B2 | 2/2010 | Mao et al. |
| 7,671,184 B2 | 3/2010 | Haener et al. |
| 7,709,249 B2 | 5/2010 | Bedingham et al. |
| 7,767,423 B2 | 8/2010 | Kopreski et al. |
| 7,771,949 B2 | 8/2010 | Kramer |
| 7,919,237 B2 | 4/2011 | Dimitrov et al. |
| 7,919,244 B2 | 4/2011 | Madejon et al. |
| 7,930,106 B2 | 4/2011 | Carrick et al. |
| 7,941,279 B2 | 5/2011 | Hwang et al. |
| 8,039,215 B2 | 10/2011 | Higuchi et al. |
| 8,148,512 B2 | 4/2012 | Dimitrov et al. |
| 8,426,132 B2 | 4/2013 | Li et al. |
| 8,455,184 B2 | 6/2013 | Atchley et al. |
| 8,492,094 B2 | 7/2013 | Dimitrov et al. |
| 8,519,115 B2 | 8/2013 | Webster et al. |
| 8,614,061 B2 | 12/2013 | Brabetz et al. |
| 8,771,955 B2 | 7/2014 | Reed et al. |
| 8,838,394 B2 | 9/2014 | Kartalov et al. |
| 8,877,464 B2 | 11/2014 | Babiel et al. |
| 8,962,250 B2 | 2/2015 | Stanley et al. |
| 9,133,506 B2 | 9/2015 | Katzir et al. |
| 9,222,128 B2 | 12/2015 | Saxonov et al. |
| 9,260,761 B2 | 2/2016 | Tyagi et al. |
| 9,366,632 B2 | 6/2016 | Link et al. |
| 9,422,593 B2 | 8/2016 | Rothmann et al. |
| 9,441,266 B2 | 9/2016 | Larson et al. |
| 9,447,457 B2 | 9/2016 | Chun et al. |
| 9,458,497 B2 | 10/2016 | Hassibi et al. |
| 9,791,372 B2 | 10/2017 | Malik et al. |
| 9,921,154 B2 | 3/2018 | Jouvenot et al. |
| 10,066,263 B2 | 9/2018 | Rajagopal et al. |
| 10,068,051 B2 | 9/2018 | Kartalov et al. |
| 10,301,668 B2 | 5/2019 | Jacky |
| 10,770,170 B2 | 9/2020 | Kartalov et al. |
| 2002/0022273 A1 | 2/2002 | Empedocles et al. |
| 2002/0146734 A1 | 10/2002 | Ortyn et al. |
| 2003/0073085 A1 | 4/2003 | Lai et al. |
| 2003/0134320 A1 | 7/2003 | Barrus et al. |
| 2003/0148280 A1 | 8/2003 | Harris et al. |
| 2003/0148544 A1 | 8/2003 | Nie et al. |
| 2004/0023207 A1 | 2/2004 | Polansky |
| 2004/0053230 A1 | 3/2004 | Schaffer et al. |
| 2004/0191794 A1 | 9/2004 | Weindel et al. |
| 2004/0248082 A1 | 12/2004 | Scallon |
| 2004/0259118 A1 | 12/2004 | Macevicz |
| 2005/0053950 A1 | 3/2005 | Zudaire Ubani et al. |
| 2005/0064435 A1 | 3/2005 | Su et al. |
| 2005/0106607 A1 | 5/2005 | Yin et al. |
| 2005/0164264 A1 | 7/2005 | Shipwash |
| 2005/0214753 A1 | 9/2005 | Shultz et al. |
| 2005/0250146 A1 | 11/2005 | McMillan |
| 2005/0260640 A1 | 11/2005 | Andersen et al. |
| 2006/0039918 A1 | 2/2006 | Albani et al. |
| 2006/0216708 A1 | 9/2006 | Venema |
| 2007/0072211 A1 | 3/2007 | Newton et al. |
| 2007/0161043 A1 | 7/2007 | Nie et al. |
| 2007/0178485 A1 | 8/2007 | El-Deiry et al. |
| 2007/0231824 A1 | 10/2007 | Chee et al. |
| 2008/0003599 A1 | 1/2008 | Dary et al. |
| 2008/0050737 A1 | 2/2008 | Arieli et al. |
| 2008/0069733 A1 | 3/2008 | Maltezos et al. |
| 2008/0096767 A1 | 4/2008 | Kohn |
| 2008/0124705 A1 | 5/2008 | Kramer |
| 2009/0042735 A1 | 2/2009 | Blair et al. |
| 2009/0048785 A1 | 2/2009 | Katzir et al. |
| 2009/0062129 A1 | 3/2009 | McKernan et al. |
| 2010/0015607 A1 | 1/2010 | Geiss et al. |
| 2010/0041092 A1 | 2/2010 | Lin et al. |
| 2010/0047924 A1 | 2/2010 | Webster et al. |
| 2010/0112710 A1 | 5/2010 | Geiss et al. |
| 2010/0120043 A1 | 5/2010 | Sood et al. |
| 2010/0129792 A1 | 5/2010 | Makrigiorgos |
| 2010/0151443 A1 | 6/2010 | Xiang et al. |
| 2010/0159447 A1 | 6/2010 | Li et al. |
| 2010/0210472 A1 | 8/2010 | Empedocles et al. |
| 2010/0233686 A1 | 9/2010 | Higuchi et al. |
| 2010/0248257 A1 | 9/2010 | Jacobsen et al. |
| 2010/0261026 A1 | 10/2010 | Ferree et al. |
| 2010/0267064 A1 | 10/2010 | Kartalov et al. |
| 2010/0273173 A1 | 10/2010 | Hirai et al. |
| 2010/0317005 A1 | 12/2010 | Hardin et al. |
| 2010/0324834 A1 | 12/2010 | Treptow et al. |
| 2011/0104684 A1 | 5/2011 | Hooper |
| 2011/0151459 A1 | 6/2011 | Rothmann et al. |
| 2011/0151550 A1 | 6/2011 | Sagner et al. |
| 2011/0159499 A1 | 6/2011 | Hindson et al. |
| 2011/0171658 A1 | 7/2011 | Carrick |
| 2011/0183884 A1 | 7/2011 | Miller et al. |
| 2011/0207623 A1 | 8/2011 | Dimitrov et al. |
| 2011/0223602 A1 | 9/2011 | Whitman et al. |
| 2011/0237459 A1 | 9/2011 | Nova et al. |
| 2012/0003646 A1 | 1/2012 | Joo et al. |
| 2012/0040349 A1 | 2/2012 | Von et al. |
| 2012/0040352 A1 | 2/2012 | Wangh et al. |
| 2012/0045756 A1 | 2/2012 | Rothmann et al. |
| 2012/0077195 A1 | 3/2012 | Li et al. |
| 2012/0077692 A1 | 3/2012 | Hassibi et al. |
| 2012/0101740 A1 | 4/2012 | Orpana et al. |
| 2012/0122704 A1 | 5/2012 | Atchley et al. |
| 2012/0141995 A1 | 6/2012 | Li et al. |
| 2012/0164692 A1 | 6/2012 | Chun |
| 2012/0171677 A1 | 7/2012 | Ludowise |
| 2012/0184017 A1 | 7/2012 | Chatterjee |
| 2012/0190030 A1 | 7/2012 | Chun et al. |
| 2012/0196283 A1 | 8/2012 | Babiel et al. |
| 2012/0244534 A1 | 9/2012 | Ching et al. |
| 2012/0252014 A1 | 10/2012 | Loeffert et al. |
| 2012/0252017 A1 | 10/2012 | Reed et al. |
| 2012/0258457 A1 | 10/2012 | Jarosch et al. |
| 2012/0302448 A1 | 11/2012 | Hutchison et al. |
| 2013/0017971 A1 | 1/2013 | Geiss et al. |
| 2013/0022973 A1 | 1/2013 | Hansen et al. |
| 2013/0040841 A1 | 2/2013 | Saxonov et al. |
| 2013/0078626 A1 | 3/2013 | Wasserstrom et al. |
| 2013/0116780 A1 | 5/2013 | Miller et al. |

(56) References Cited

U.S. PATENT DOCUMENTS

| | | |
|---|---|---|
| 2013/0209997 A1 | 8/2013 | Whitney et al. |
| 2013/0261019 A1 | 10/2013 | Lin et al. |
| 2013/0288244 A1 | 10/2013 | Deciu et al. |
| 2014/0004520 A1 | 1/2014 | Mohapatra et al. |
| 2014/0038195 A1 | 2/2014 | Malik et al. |
| 2014/0057273 A1 | 2/2014 | Litterst et al. |
| 2014/0171341 A1 | 6/2014 | Jouvenot et al. |
| 2014/0213471 A1 | 7/2014 | Rajagopal et al. |
| 2014/0221237 A1* | 8/2014 | Tzonev ............ C12Q 1/6851 506/9 |
| 2014/0274774 A1 | 9/2014 | Li et al. |
| 2014/0274786 A1 | 9/2014 | McCoy et al. |
| 2015/0051085 A1 | 2/2015 | Vogelstein et al. |
| 2015/0057178 A1 | 2/2015 | Kartalov et al. |
| 2015/0072887 A1 | 3/2015 | Chun et al. |
| 2015/0111776 A1 | 4/2015 | Chen |
| 2015/0140554 A1 | 5/2015 | Snyder et al. |
| 2015/0211054 A1 | 7/2015 | Kostem et al. |
| 2015/0275295 A1 | 10/2015 | Wang et al. |
| 2016/0040249 A1 | 2/2016 | Ceppi et al. |
| 2016/0040256 A1 | 2/2016 | Chen et al. |
| 2016/0108464 A1 | 4/2016 | Saxonov et al. |
| 2016/0201122 A1 | 7/2016 | Bushkin et al. |
| 2016/0273048 A1 | 9/2016 | Roperch |
| 2017/0145490 A1 | 5/2017 | Chiu et al. |
| 2017/0314073 A1 | 11/2017 | Grömminger et al. |
| 2017/0362636 A1 | 12/2017 | Rajagopal et al. |
| 2018/0030551 A1 | 2/2018 | Rajagopal et al. |
| 2018/0052110 A1 | 2/2018 | Malik et al. |
| 2018/0057864 A1 | 3/2018 | Jacky et al. |
| 2019/0002963 A1 | 1/2019 | Rajagopal |
| 2019/0032112 A1 | 1/2019 | Rajagopal et al. |
| 2019/0112636 A1 | 4/2019 | Rajagopal et al. |
| 2019/0233882 A1 | 8/2019 | Jacky et al. |
| 2019/0309352 A1 | 10/2019 | Buis et al. |
| 2020/0010876 A1 | 1/2020 | MacDonald |
| 2020/0087709 A1 | 3/2020 | Bracht et al. |
| 2020/0087714 A1 | 3/2020 | Jacky et al. |
| 2020/0407794 A1 | 12/2020 | MacDonald |
| 2021/0012860 A1 | 1/2021 | Kartalov et al. |
| 2021/0087607 A1 | 3/2021 | Rajagopal et al. |
| 2021/0189473 A1 | 6/2021 | Rajagopal et al. |
| 2021/0208071 A1 | 7/2021 | Rajagopal et al. |
| 2021/0292817 A1 | 9/2021 | Rajagopal et al. |
| 2022/0002788 A1 | 1/2022 | Jacky et al. |
| 2022/0127664 A1 | 4/2022 | Rajagopal |
| 2022/0389495 A1 | 12/2022 | MacDonald et al. |
| 2023/0038055 A1 | 2/2023 | Rajagopal et al. |

FOREIGN PATENT DOCUMENTS

| | | | |
|---|---|---|---|
| CN | 101570782 | A | 11/2009 |
| CN | 101583724 | A | 11/2009 |
| CN | 101646786 | A | 2/2010 |
| CN | 101831496 | A | 9/2010 |
| CN | 102269759 | A | 12/2011 |
| CN | 102439171 | A | 5/2012 |
| CN | 102559868 | A | 7/2012 |
| CN | 102576390 | A | 7/2012 |
| CN | 102985552 | A | 3/2013 |
| CN | 103293299 | A | 9/2013 |
| CN | 104404162 | A | 3/2015 |
| CN | 104662172 | A | 5/2015 |
| CN | 105074060 | A | 11/2015 |
| CN | 106148521 | A | 11/2016 |
| CN | 106636409 | A | 5/2017 |
| CN | 104662172 | B | 7/2018 |
| EP | 0519338 | A1 | 12/1992 |
| EP | 1087020 | A2 | 3/2001 |
| EP | 1448581 | B1 | 11/2008 |
| EP | 2224017 | A1 | 9/2010 |
| EP | 1963531 | B1 | 9/2011 |
| EP | 1629108 | B1 | 12/2014 |
| EP | 2809813 | A1 | 12/2014 |
| GB | 2526445 | A | 11/2015 |
| JP | 2005508493 | A | 3/2005 |
| JP | 2007525184 | A | 9/2007 |
| WO | WO-9746714 | A1 | 12/1997 |
| WO | WO-9919515 | A1 | 4/1999 |
| WO | WO-99/52708 | | 10/1999 |
| WO | WO-0107640 | A2 | 2/2001 |
| WO | WO-0159144 | A1 | 8/2001 |
| WO | WO-02056014 | A2 | 7/2002 |
| WO | WO-03002979 | A2 | 1/2003 |
| WO | WO-03003015 | A2 | 1/2003 |
| WO | WO-03020967 | A1 | 3/2003 |
| WO | WO-02056014 | A3 | 10/2003 |
| WO | WO-2004087950 | A2 | 10/2004 |
| WO | WO-2004099434 | A2 | 11/2004 |
| WO | WO-2006079049 | A2 | 7/2006 |
| WO | WO-2006138679 | A2 | 12/2006 |
| WO | WO-2007076128 | A2 | 7/2007 |
| WO | WO-2007076129 | A2 | 7/2007 |
| WO | WO-2007076132 | A2 | 7/2007 |
| WO | WO-2007076132 | A3 | 9/2007 |
| WO | WO-2007076128 | A3 | 11/2007 |
| WO | WO-2007139766 | A2 | 12/2007 |
| WO | WO-2007076129 | A3 | 3/2008 |
| WO | WO-2008118998 | A2 | 10/2008 |
| WO | WO-2008124847 | A2 | 10/2008 |
| WO | WO-2007139766 | A3 | 12/2008 |
| WO | WO-2008124847 | A3 | 2/2009 |
| WO | WO-2009036514 | A2 | 3/2009 |
| WO | WO-2010007355 | A1 | 1/2010 |
| WO | WO-2010013017 | A1 | 2/2010 |
| WO | WO-2010017543 | A1 | 2/2010 |
| WO | WO-2010019826 | A1 | 2/2010 |
| WO | WO-2010-075413 | A1 | 7/2010 |
| WO | WO-2010128206 | A1 | 11/2010 |
| WO | WO-2011047087 | A2 | 4/2011 |
| WO | WO-2011047087 | A3 | 8/2011 |
| WO | WO-2011100541 | A2 | 8/2011 |
| WO | WO-2011116088 | A2 | 9/2011 |
| WO | WO-2011100541 | A3 | 1/2012 |
| WO | WO-2011116088 | A3 | 2/2012 |
| WO | WO-2012056227 | A2 | 5/2012 |
| WO | WO-2012058638 | A2 | 5/2012 |
| WO | WO-2012106428 | A2 | 8/2012 |
| WO | WO-2012135340 | A2 | 10/2012 |
| WO | WO-2012058638 | A3 | 12/2012 |
| WO | WO-2012135340 | A3 | 12/2012 |
| WO | WO-2013096851 | A1 | 6/2013 |
| WO | WO-2013116780 | A1 | 8/2013 |
| WO | WO-2014022827 | A1 | 2/2014 |
| WO | WO-2014116884 | A1 | 7/2014 |
| WO | WO-2014149480 | A1 | 9/2014 |
| WO | WO-2015147370 | A1 | 10/2015 |
| WO | WO-2016154600 | A1 | 9/2016 |
| WO | WO-2016172632 | A2 | 10/2016 |
| WO | WO-2017139354 | A1 | 8/2017 |
| WO | WO-2017173035 | A1 | 10/2017 |
| WO | WO-2017218777 | A1 | 12/2017 |
| WO | WO-2018081178 | A1 | 5/2018 |
| WO | WO-2019006023 | A1 | 1/2019 |
| WO | WO-2019079204 | A1 | 4/2019 |
| WO | WO-2019169043 | A1 | 9/2019 |
| WO | WO-2019204357 | A1 | 10/2019 |
| WO | WO-2019236447 | A1 | 12/2019 |
| WO | WO-2020010137 | A1 | 1/2020 |
| WO | WO-2020014388 | A1 | 1/2020 |
| WO | WO-2020051521 | A1 | 3/2020 |
| WO | WO-2021211613 | A1 | 10/2021 |
| WO | WO-2023014898 | A1 | 2/2023 |

OTHER PUBLICATIONS

McDermott et al., (Anal Chem, 2013, 85, 11619-11627, IDS reference) (Year: 2013).*
Lim et al. (J of Virol Methods, 2017, 247, 14-21) (Year: 2017).*
Hindson et al. (Anal. Chem, 2011, 83:8604-8610) (Year: 2011).*
Dobnik et al. (Anal Chem, 2015, 87:8218-8226) (Year: 2015).*
Arya, et al., Basic principles of real-time quantitative PCR, 2005,

(56) References Cited

OTHER PUBLICATIONS

Expert Rev. Mol. Diagn., 5(2), p. 209-219.
Beige, et al. Clinical evaluation of a *Mycobacterium tuberculosis* PCR assay. J Clin Microbiol. Jan. 1995;33(1):90-5.
Blacket et al. Universal primers for fluorescent labeling of PCR fragments—an efficient and cost-effective approach to genotyping by fluorescence. Moleular Ecology Resources 12(3):456-463 (2012) Epub Jan. 24, 2012.
Chamberlain, et al. Deletion screening of the Duchenne muscular dystrophy locus via multiplex DNA amplification. Nucleic Acids Res. Dec. 9, 1988;16(23):11141-56.
Chapin et al., Rapid microRNA profiling on encoded gel microparticles. Angewandte Chemie International Edition, 50(10):2289-2293, 2011.
Chen, et al. A Homogeneous, ligase-mediated DNA diagnostic test. Genome Research, 1998, vol. 8, pp. 549-556.
Chong, et al. Single-tube multiplex-PCR screen for common deletional determinants of alpha-thalassemia. Blood. Jan. 1, 2000;95(1):360-2.
Chromatogram, 2011, 2 pages. Dorland's illustrated medical dictionary. Retrieved online on Jan. 22, 2014 from « http://www.credoreference.com».
Chun et al. Dual priming oligonucleotide system for the multiplex detection of respiratory viruses and SNP genotyping of CYP2C19 gene. Nucleic Acids Res. 35(6):e40 (2007).
Co-pending U.S. Appl. No. 16/864,744, inventors Kartalovemil; P. et al., filed May 1, 2020.
Craig, et al. Ordering of cosmid clones covering Herpes simplex virus type I (HSV-I) genome: a test case for fingerprinting by hybridisation. Nucleic Acids Research, 1990, vol. 18, pp. 2653-2660.
Dos Santos, et al. A simple one-step real-time RT-PCR for diagnosis of dengue virus infection. J Med Virol. Aug. 2008;80(8):1426-33.
El-Hajj, et al. Detection of rifampin resistance in *Mycobacterium tuberculosis* in a single tube with molecular beacons. J Clin Microbiol. Nov. 2001;39(11):4131-7.
EMBL-Bank: AJ303204 http://www.ebi.ac.uk/Tools/dbfetch/emblfetch?db=embl&id=AJ303204&format=default&style=default&Retrieve=Retrieve. Accessed Feb. 2012.
EMBL-Bank: GQ395623. http://www.ebi.ac.uk/Tools/dbfetch/emblfetch?db=embl&id=GQ395623&format=default&style=default&Retrieve=Retrieve. Accessed Feb. 2012.
EP17814096.8 Extended European Search Report dated Dec. 2, 2019.
European Office Action for Patent Application No. EP13824744.0 dated Nov. 6, 2018.
European U.S. Appl. No. 17/776,626 Office Action dated Oct. 18, 2019.
Evans et al. Digital PCR for Noninvasive Detection of Aneuploidy: Power Analysis Equations for Feasibility. Fetal Diagn. Ther. 31:244-247(2012).
Extended European Search Report for Patent Application No. 13744261.2 dated May 3, 2016.
Extended European Search Report for Patent Application No. EP13824744.0 dated Feb. 26, 2016.
Fodor, et al. Multiplexed biochemical assays with biological chips. Nature. Aug. 5, 1993;364(6437):555-6.
Fortina, et al. Digital mRNA profiling. Nat Biotechnol. Mar. 2008;26(3):293-4.
Fu et al. Multiplex detection and SNP genotyping in a single fluorescence channel. PLoS One 7(1):Article No. e30340 (Jan. 2012).
Gandelman, et al., Novel Bioluminescent Quantitative Detection of Nucleic Acid Amplification in Real-Time, PLoS One, 2010, 5(11):e14155, 14 pages.
GenBank: M93130.1. Dengue type 3 virus complete genome RNA, complete cds. http://www.ncbi.nlm.nih.gov/nuccore/M93130. Accessed Feb. 2012.
Han, et al., Quantum-dot-tagged microbeads for multiplexed optical coding of biomolecules. Nature Biotechnology 19.99 (Jul. 2001): 631-635.

Hartman, et al. Development of a novel internal positive control for Taqman based assays. Mol Cell Probes. Feb. 2005; 19(1):51-9. Epub Dec. 10, 2004.
Haustein et al. Fluorescence correlation spectroscopy: novel variations of an established technique. Ann Rev Biophys Biomol Struct 36:151-69 (2007).
Heidari, et al. Detection of Plasmodium falciparum Directly from Blood Samples Using the Polymerase Chain Reaction. Journal of Sciences, Islamic Republic of Iran. 2005 16(1):21-24.
Henegariu, et al. Multiplex PCR: critical parameters and step-by-step protocol. Biotechniques. Sep. 1997;23(3):504-11.
HIV databases. http://www.hiv.lanl.gov/content/index. Accessed Feb. 2012.
Holland, et al., Detection of specific polymerase chain reaction product by utilizing the 5' to 3' exonuclease activity of Thermus aquaticus DNA polymerase. PNAS (USA) 88:7276-7280, 1991.
Horejsh, et al. A molecular beacon, bead-based assay for the detection of nucleic acids by flow cytometry. Nucleic Acids Res. Jan. 19, 2005;33(2):e13.
Huang, et al. Identification of 8 foodborne pathogens by multicolor combinational probe coding technology in a single real-time PCR. Clin Chem. Oct. 2007;53(10):1741-8. Epub Aug. 10, 2007.
Huang, et al. Multicolor combinatorial probe coding for real-time PCR. PLoS One. Jan. 14, 2011;6(1):e16033.
Hudecova, I. et al. Maternal Plasma Fetal DNA Fractions in Pregnancies with Low and High Risks for Fetal Chromosomal Aneuploidies. PLoS ONE 9(2):e88484 (2014).
International Search Report and Written Opinion dated Nov. 21, 2019 for PCT/US2019/050050.
Jothikumar, et al. Design of FRET-TaqMan probes for multiplex real-time PCR using an internal positive control. Biotechniques. Jun. 2009;46(7):519-24.
Klostranec et al., Convergence of quantum dot barcodes with microfluidics and signal processing for multiplexed high-throughput infectious disease diagnostics. Nano Letters, 7(9):2812-2818, 2007.
Kuhn et al. Hybridization of DNA and PNA molecular beacons to single-stranded and double-stranded DNA targets. J Am Chem Soc. 124(6):1097-103 (2002).
Lao, et al. Multiplexing RT-PCR for the detection of multiple miRNA species in small samples. Biochem Biophys Res Commun. Apr. 28, 2006;343(1):85-9. Epub Feb. 28, 2006.
Lee, et al. Novel multiplex PCR using dual-priming oligonucleotides for detection and discrimination of the *Mycobacterium tuberculosis* complex and M. bovis BCG. J Clin Microbiol. Dec. 2010;48(12):4612-4. Epub Oct. 13, 2010.
Lee, et al. Seven-color, homogeneous detection of six PCR products. Biotechniques. Aug. 1999;27(2):342-9.
Li et al., Multiplexed detection of pathogen DNA with DNA-based fluorescence nanobarcodes. Nature Biotechnology, 23(7):885-889, 2005.
Liew, et al. Validating a custom multiplex ELISA against individual commercial immunoassays using clinical samples. Biotechniques. Mar. 2007;42(3):327-8, 330-3.
Lin et al., Self-assembled combinatorial encoding nanoarrays for multiplexed biosensing. Nano Letters, 7(2):507-512, 2007.
Livak, et al. Oligonucleotides with fluorescent dyes at opposite ends provide a quenched probe system useful for detecting PCR product and nucleic acid hybridization. PCR Methods Appl. Jun. 1995;4(6):357-62.
Loftis et al., Principles of real-time PCR. Veterinary PCR Diagnostics pp. 3-17 (2012).
Logan, et al., An Overview of real-time PCR platforms. 2004, In Real-time PCR: An essential guide, p. 13-30.
Morgan et al., A commercial line probe assay for the rapid detection of rifampicin resistance in *Mycobacterium tuberculosis*: a systematic review and meta-analysis. BMC Infectious Diseases. 5:62 doi:10.1186/1471-2334-5-62 (2005).
Morrison, et al. Two-color ratio-coding of chromosome targets in fluorescence in situ hybridization: quantitative analysis and reproducibility. Cytometry. Apr. 1, 1997;27(4):314-26.
Myers et al., A Handheld Point-of-Care Genomic Diagnostic System. PLoS One 8(8): e70266; pp. 1-9 (2013).

(56) References Cited

OTHER PUBLICATIONS

Navarro et al., Real-time PCR detection chemistry. Clin Chim Acta. 439:231-250 (2015).
Noordhoek, et al. Sensitivity and specificity of PCR for detection of *Mycobacterium tuberculosis*: a blind comparison study among seven laboratories. J Clin Microbiol. Feb. 1994;32(2):277-84.
Oliveira, et al. Multiplex PCR strategy for rapid identification of structural types and variants of the mec element in methicillin-resistant *Staphylococcus aureus*. Antimicrob Agents Chemother. Jul. 2002;46(7):2155-61.
Ou, et al. DNA amplification for direct detection of HIV-1 in DNA of peripheral blood mononuclear cells. Science. Jan. 15, 1988;239(4837):295-7.
Paton, et al. Detection and characterization of Shiga toxigenic *Escherichia coli* by using multiplex PCR assays for stx1, stx2, eaeA, enterohemorrhagic *E. coli* hlyA, rfbO111, and rfbO157. J Clin Microbiol. Feb. 1998;36(2):598-602.
Patterson, et al. Detection of HIV-1 Dna and messenger RNA in individual cells by PCR-driven in situ hybridization and flow cytometry. Science. May 14, 1993;260(5110):976-9.
PCT/US19/40392 International Search Report and Written Opinion dated Nov. 6, 2019.
PCT/US2013/024509 International search report and written opinion dated Apr. 12, 2013.
PCT/US2013/053512 International Search Report and Written Opinion dated Oct. 16, 2013.
PCT/US2017/24933 International search report and written report dated Jun. 22, 2017.
PCT/US2017/37682 International Search Report and Written Opinion dated Nov. 16, 2017.
PCT/US2018/039846 International Preliminary Report on Patentability dated Dec. 31, 2019.
PCT/US2018/055927 International Preliminary Report on Patentability dated Apr. 21, 2020.
PCT/US2018/39846 International Search Report and Written Opinion Mailed Sep. 14, 2018.
PCT/US2019/019906 International Preliminary Report on Patentability Sep. 1, 2020.
PCT/US2019/019906 International Search Report and Written Opinion dated May 6, 2019.
PCT/US2019/027751 International Preliminary Report on Patentability dated Oct. 20, 2020.
PCT/US2019/027751 International Search Report and Written Opinion dated Jun. 26, 2019.
PCT/US2019/035129 International Search Report and Written Opinion dated Nov. 1, 2019.
PCT/US2019/035129 Invitation to Pay Additional Fees dated Aug. 19, 2019.
PCT/US2019/040392 International Preliminary Report on Patentability dated Jan. 5, 2021.
PCT/US2019/041239 International Preliminary Report on Patentability dated Jan. 21, 2021.
PCT/US2019/041239 International Search Report and Written Opinion dated Sep. 30, 2019.
Petersen, et al. Short PNA molecular beacons for real-time PCR allelic discrimination of single nucleotide polymorphisms. Mol Cell Probes. Apr. 2004;18(2):117-22.
Pierce, et al. Linear-After-The-Exponential (LATE)-PCR: primer design criteria for high yields of specific single-stranded DNA and improved real-time detection. Proc Natl Acad Sci U S A. Jun. 14, 2005; 102(24):8609-14. Epub Jun. 3, 2005.
Plasmodium falciparum (Plasmodium falciparum) Genome Browser Gateway. http://microbes.ucsc.edu/cgi-bin/hgGateway?hgsid=612764&clade=eukaryota-protista&org=0&db=0. Accessed Feb. 2012.
Ptak, et al. Inhibition of human immunodeficiency virus type 1 replication in human cells by Debio-025, a novel cyclophilin binding agent. Antimicrob Agents Chemother. Apr. 2008;52(4):1302-17. Epub Jan. 22, 2008.
Rajagopal et al. Supercolor Coding Methods for Large-Scale Multiplexing of Biochemical Assays. Analytical Chemistry 85:7629-7636 (2013).
Rajagopal et al., Significant Expansion of Real-Time PCR Multiplexing with Traditional Chemistries using Amplitude Modulation. Scientific Reports. 9(1): 1053 (2019).
Rickert et al., "Multiplexed Real-Time PCR Using Universal Reporters," Clin. Chem., 50(9):1680-1683, 2004.
Rosenstraus, et al. An internal control for routine diagnostic PCR: design, properties, and effect on clinical performance. J Clin Microbiol. Jan. 1998;36(1):191-7.
Roth, et al. Feasibility and efficacy of routine PCR screening of blood donations for hepatitis C virus, hepatitis B virus, and HIV-1 in a blood-bank setting. Lancet. Jan. 30, 1999;353(9150):359-63.
Saiki, et al. Primer-directed enzymatic amplification of DNA with a thermostable DNA polymerase. Science, 239(4839):487-491 (Jan. 29, 1988).
Sambrook, et al. Molecular Cloning: A Laboratory Manual. 2nd Edition, 1989.
Sanger et al. DNA sequencing with chain-terminating inhibitors. PNAS USA Dec. 1977;74(12):5463-7 (1977).
Second Office Action for Chinese Patent Application No. 201380049844.9 dated Sep. 19, 2016 (w/translation).
Speicher, et al. Karyotyping human chromosomes by combinatorial multi-fluor FISH. Nat Genet. Apr. 1996;12(4):368-75.
ThermoFisher Scientific Fluorescence SpectraViewer. Retrieved from http://www.thermofisher.com/US/en/home/life-science/cell-analysis/labeling-chemistry/fluorescence-spectraviewer.html on Sep. 25, 2015.
Tirasophon, et al. A novel detection of a single Plasmodium falciparum in infected blood. Biochem Biophys Res Commun. Feb. 28, 1991;175(1):179-84.
Tyagi, et al. Multicolor molecular beacons for allele discrimination. Nat Biotechnol. Jan. 1998;16(1):49-53.
Tyagi, et al. Wavelength-shifting molecular beacons. Nat Biotechnol. Nov. 2000;18(11):1191-6.
U.S. Appl. No. 16/128,343 Final Office Action dated Mar. 16, 2021.
Urdea, et al. Requirements for high impact diagnostics in the developing world. Nature. Nov. 23, 2006;444 Suppl 1:73-9.
U.S. Appl. No. 13/756,760 Notice of allowance dated Jun. 2, 2014.
U.S. Appl. No. 13/756,760 Office action dated Jan. 24, 2014.
U.S. Appl. No. 13/958,479 Office Action dated Mar. 1, 2016.
U.S. Appl. No. 14/451,876 Office action dated Jun. 6, 2017.
U.S. Appl. No. 14/451,876 Office action dated Nov. 23, 2016.
U.S. Appl. No. 15/623,974 Notice of Allowance dated Jul. 3, 2018.
U.S. Appl. No. 15/623,974 Office Action dated Feb. 22, 2018.
U.S. Appl. No. 15/677,772 Final Office Action Mailed Jun. 7, 2018.
U.S. Appl. No. 15/677,772 Non-Final Office Action Mailed Feb. 8, 2018.
U.S. Appl. No. 15/892,245 First Action Interview—Office Action mailed Jul. 19, 2018.
U.S. Appl. No. 15/892,245 Office Action dated Dec. 31, 2018.
U.S. Appl. No. 15/892,245 Preinterview First Interview Office Action Mailed May 11, 2018.
U.S. Appl. No. 16/020,673 Non-Final Office Action dated Nov. 27, 2020.
U.S. Appl. No. 14/451,876 Notice of Allowance dated Jul. 11, 2018.
U.S. Appl. No. 14/451,876 Notice of Allowance dated Jun. 14, 2018.
U.S. Appl. No. 15/892,245 Office Action dated Dec. 11, 2019.
U.S. Appl. No. 15/892,245 Office Action dated Jun. 17, 2019.
U.S. Appl. No. 16/128,343 Non-Final Office Action dated Jun. 16, 2020.
U.S. Appl. No. 16/128,343 Office Action dated Oct. 15, 2019.
U.S. Appl. No. 15/701,014 Office Action dated Jan. 24, 2020.
U.S. Appl. No. 15/914,356 Office Action dated Jul. 22, 2019.
U.S. Appl. No. 15/914,356 Office Action dated Mar. 8, 2019.
U.S. Appl. No. 16/051,736 Office Action dated Aug. 21, 2020.
U.S. Appl. No. 16/128,343 First Action Interview dated Apr. 18, 2019.
Vet, et al. Multiplex detection of four pathogenic retroviruses using molecular beacons. Proc Natl Acad Sci U S A. May 25, 1999;96(11):6394-9.

(56) References Cited

OTHER PUBLICATIONS

Vogelstein, et al., Digital PCR, PNAS Aug. 3, 1999 96 (16) 9236-9241; https://doi.org/10.1073/pnas.96.16.9236.
Wang, et al. Locked nucleic acid molecular beacons. J Am Chem Soc. Nov. 16, 2005;127(45):15664-5.
Waters, et al. Microchip device for cell lysis, multiplex PCR amplification, and electrophoretic sizing. Anal Chem. Jan. 1, 1998;70(1):158-62.
Weidmann, et al. Rapid detection of herpes simplex virus and varicella-zoster virus infections by real-time PCR. J Clin Microbiol. Apr. 2003;41(4):1565-8.
Wiese, et al. Simultaneous multianalyte ELISA performed on a microarray platform. Clin Chem. Aug. 2001;47(8):1451-7.
Xu et al., Multiplexed SNP genotyping using the Qbead system: a quantum dot-encoded microspere-based assay. Nucleic Acids Research, 31(8):e43, 2003.
Yang, L. et al. A novel universal real-time PCR system using the attached universal duplex probes for quantitative analysis of nucleic acids. BMC Molecular Biology, 9:54 (1-13) Jun. 4, 2008.
Zhang, et al. A novel real-time quantitative PCR method using attached universal template probe. Nucleic Acids Res. Oct. 15, 2003;31(20):e123(pp. 1-8).
Zhang, et al. Novel Multiplex PCR Assay for Characterization and Concomitant Subtyping of Staphylococcal Cassette Chromosome mec Types I to V in Methicillin-Resistant *Staphylococcus aureus*. J Clin Microbiol. Oct. 2005;43(10):5026-33.
Zhao et al. Comprehensive Algorithm for Quantitative Real-Time Polymerase Chain Reaction. Journal of Computational Biology 12(8):1047-1064 (2005).
Belák et al., Novel and rapid technologies for the early diagnosis and molecular epidemiology of viral diseases (Ed. Odongo et al.). Sustainable Improvement of Animal Production and Health, FAO of the UN, Rome. pp. 295-303 (2010).
Elnifro et al., Multiplex PCR: optimization and application in diagnostic virology. Clin Microbiol Rev. 13(4):559-570 (2000).
Even et al., T-cell repertoires in healthy and diseased human tissues analysed by T-cell receptor β-chain CDR3 size determination: evidence for oligoclonal expansions in tumours and inflammatory diseases. Research in Immunology 146(2): 65-80 (1995).
Faltin et al, Current methods for fluorescence-based universal sequence-dependent detection of nucleic acids in homogenous assays and clinical applications. Clin Chem. 59(11):1567-1582 (2013).
Faltin et al., Mediator probe PCR: a novel approach for detection of real-time PCR based on label-free primary probes and standardized secondary universal fluorogenic reporters. Clin Chem. 58(11):1546-1556 (2012).
Gentile et al., Verification of monoplex and multiplex linear-after-the-exponential PCR gene-specific sepsis assays using clinical isolates. J Appl Microbiol. 114(2):586-594 (2013).
Hardenbol et al., Multiplexed genotyping with sequence-tagged molecular inversion probes. Nat Biotechnol, 21(6):673-678 (2003).
Hiatt JB, et al. Single molecule molecular inversion probes for targeted, high-accuracy detection of low-frequency variation. Genome Res. May 2013;23(5):843-54. Epub Feb. 4, 2013.
Markoulatos et al., Multiplex polymerase chain reaction: a practical approach. J Clin Lab Anal. 16(1):47-51 (2002).
Murakami et al., Specific detection and quantitation of SCC antigen 1 and SCC antigen 2 mRNAs by fluorescence-based asymmetric semi-nested reverse transcription PCR. Tumour Biol. 21(4):224-234 (2000).
Ng SB, et al. Targeted capture and massively parallel sequencing of 12 human exomes. Nature. 461(7261):272-276 (2009).
Ongagna-Yhombi et al., Improved assay to detect Plasmodium falciparum using an uninterrupted, semi-nested PCR and quantitative lateral flow analysis. Malar J. 12:74, pp. 1-8 (2013).
Periyannan Rajeswari et al., Multiple pathogen biomarker detection using an encoded bead array in droplet PCR. J Microbiol Methods. 139:22-28 (2017).
Putignani et al., Investigation of Toxoplasma gondii presence in farmed shellfish by nested-PCR and real-time PCR fluorescent amplicon generation assay (FLAG). Exp Parasitol. 127(2):409-417 (2011).
Robin et al., Comparison of DNA quantification methods for next generation sequencing. Sci Rep. 6:24067, pp. 1-10 (2016).
Sanchez et al., Linear-after-the-exponential (LATE)-PCR: an advanced method of asymmetric PCR and its uses in quantitative real-time analysis. Proc Natl Acad Sci USA. 101(7):1933-1938 (2004).
Sharath Chandra G, et al. Modified competing polymerase chain reaction primer for single tube quantitative PCR. Anal Biochem. 427(2):175-177 (2012).
Strain et al., Highly precise measurement of HIV DNA by droplet digital PCR. PLoS One. 8(4):e55943 pp. 1-8 (2013).
U.S. Appl. No. 17/047,160 Final Office Action dated May 18, 2023.
U.S. Appl. No. 17/819,597 Final Office Action dated Feb. 22, 2023.
U.S. Appl. No. 17/819,597 Office action dated Oct. 6, 2022.
U.S. Appl. No. 17/819,598 Final Office Action dated Mar. 29, 2023.
U.S. Appl. No. 17/819,598 Non-Final Office Action dated Sep. 14, 2023.
U.S. Appl. No. 17/819,598 Office action dated Nov. 25, 2022.
Whale, et al. Fundamentals of multiplexing with digital PCR. Biomolecular Detection and Quantification 10 (2016): 15-23.
Wittwer et al., Rapid polymerase chain reaction and melting analysis. The PCR Revolution: Basic Technologies and Applications (Ed. S. Bustin). Ch. 4: 48-69 (2010).
Wittwer et al., Real-time multiplex PCR assays. Methods. 25(4):430-442 (2001).
Zhong, et al. Multiplex digital PCR: breaking the one target per color barrier of quantitative PCR. Lab Chip. Jul. 7, 2011;11(13):2167-74. doi: 10.1039/c1lc20126c. Epub May 17, 2011.
First Office Action dated Nov. 9, 2023, issued in related Chinese Patent Application No. 201980040830.8, with English machine translation (21 pages).

\* cited by examiner

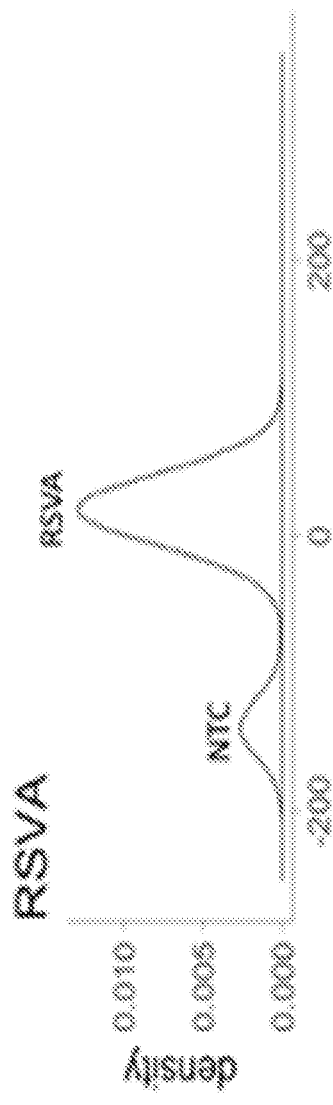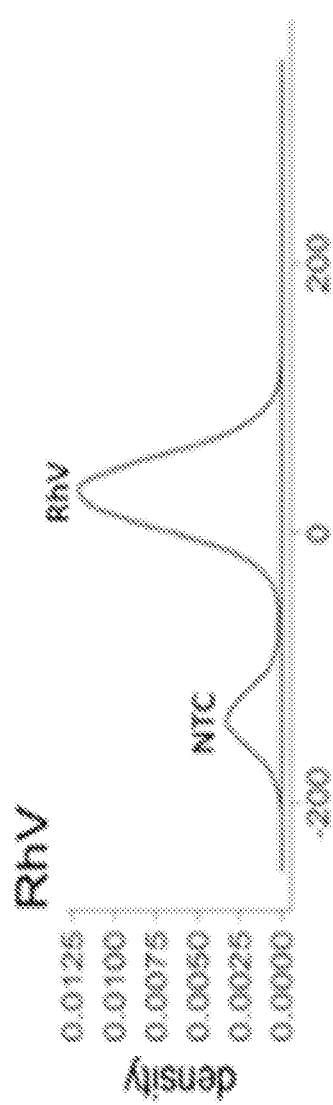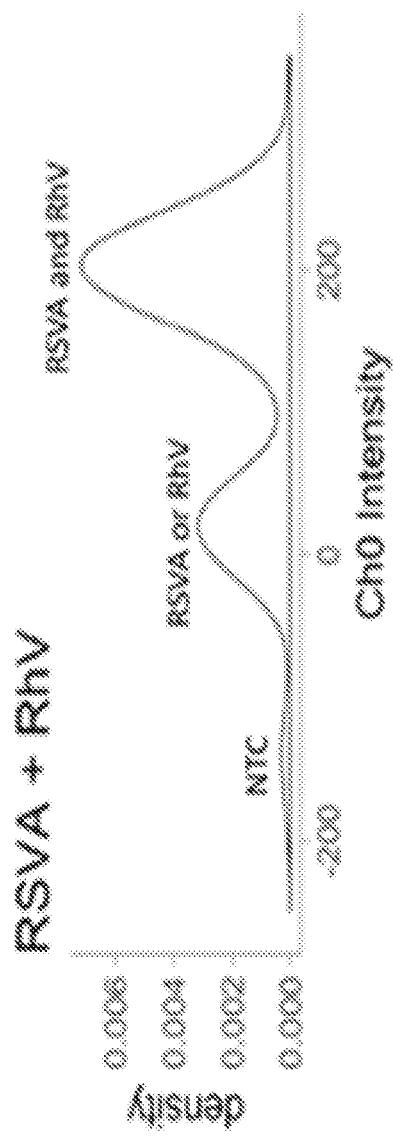
FIG. 11A
FIG. 11B
FIG. 11C

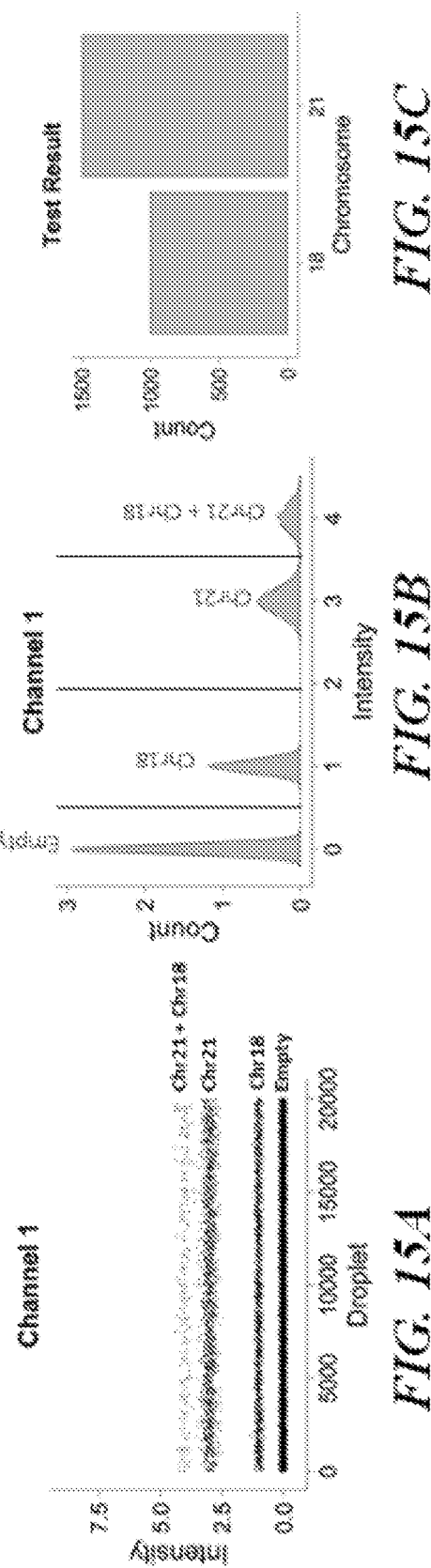

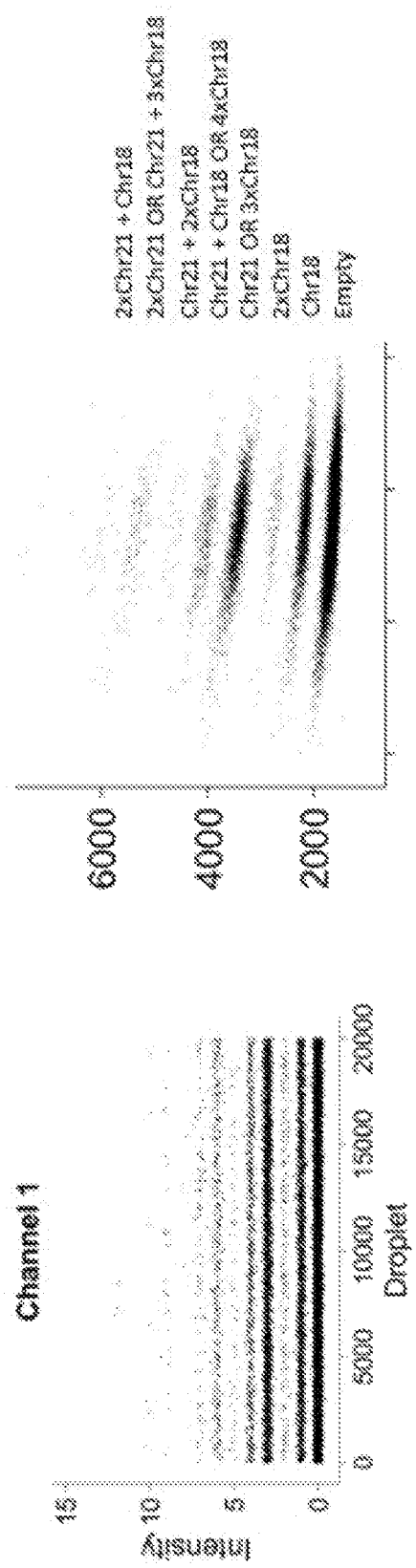
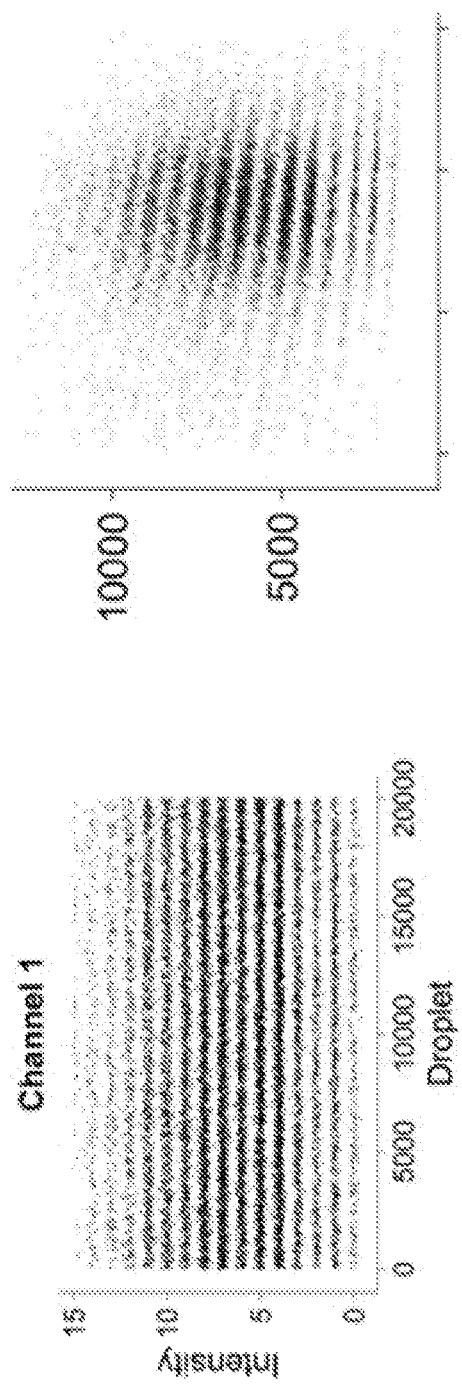
FIG. 18A
FIG. 18B
FIG. 18C
FIG. 18D

METHODS AND SYSTEMS FOR MULTIPLEX ANALYSIS

CROSS-REFERENCE

This application is a U.S. National Stage Entry of International Application No. PCT/US2019/027751, filed Apr. 16, 2019, which claims benefit and priority to U.S. Provisional Patent Application No. 62/659,025, filed Apr. 17, 2018; U.S. Provisional Application No. 62/659,027, filed Apr. 17, 2018; U.S. Provisional Application No. 62/693,754, filed Jul. 3, 2018; U.S. Provisional Application No. 62/753,782 filed Oct. 31, 2018; and U.S. Provisional Application No. 62/804,574, filed Feb. 12, 2019, each of which applications are incorporated by reference in their entirety for all purposes.

BACKGROUND

Digital PCR (dPCR) is a useful method for detection and quantification of nucleic acid targets. The use of labeled oligonucleotide probes enables specific detection of a target present in a partition (e.g., droplet, microwell). dPCR methods may involve creating spatially resolved clusters of fluorescent points and drawing a cutoff or threshold between the clusters to identify whether an individual partition contains a target of interest.

SUMMARY

Disclosed herein, in some aspects, are methods for multiplex quantitation wherein individual partitions need not be classified to quantify the concentration of targets present in the reaction.

Disclosed herein, in some aspects, is a method of quantifying a nucleic acid target in a sample, the method comprising: (a) providing a mixture comprising: (i) a plurality of nucleic acid molecules derived from, and/or corresponding with, the nucleic acid target; and (ii) a plurality of oligonucleotide probes, each of which corresponds to a different region of the nucleic acid target; (b) partitioning the mixture into a plurality of partitions; (c) generating a plurality of signals in the plurality of partitions, wherein the plurality of signals are detectable in one color channel, and wherein at least one signal of the plurality of signals corresponds with a unique combination of two or more of the plurality of nucleic acid molecules in a partition of the plurality of partitions; (d) detecting from multiple partitions of the plurality of partitions the plurality of signals in the color channel; and (e) based on the detecting, quantifying the nucleic acid target in the sample. In some embodiments, at least a portion of the plurality of signals is generated by the plurality of oligonucleotide probes. In some embodiments, the sample further comprises (iii) an additional plurality of nucleic acid molecules derived from, and/or corresponding with, an additional nucleic acid target and (iv) an additional plurality of oligonucleotide probes, each of which corresponds to a different region of the additional nucleic acid target. In some embodiments, at least a portion of the plurality of signals is generated by the plurality of oligonucleotide probes and the additional plurality of oligonucleotide probes. In some embodiments, the sample is derived from a biological sample. In some embodiments, the biological sample is blood or plasma. In some embodiments, the nucleic acid target is a chromosome. In some embodiments, the chromosome is chromosome 21, chromosome 18, chromosome 15, chromosome 13, an X chromosome, or a Y chromosome. In some embodiments, (c) comprises amplifying the plurality of nucleic acid molecules, thereby generating the plurality of signals. In some embodiments, the amplifying comprises polymerase chain reaction. In some embodiments, the amplifying degrades the plurality of oligonucleotide probes, thereby generating the plurality of signals. In some embodiments, the plurality of oligonucleotide probes are degraded by a nucleic acid enzyme, thereby releasing a signal tag from each of the plurality of oligonucleotide probes and generating the plurality of signals. In some embodiments, the plurality of signals is a plurality of fluorescent signals or a plurality of chemiluminescent signals. In some embodiments, the plurality of oligonucleotide probes each bind to a different region of the nucleic acid target. In some embodiments, the at least one of the plurality of signals uniquely corresponds with a presence of exactly two of the plurality of nucleic acid molecules in the partition. In some embodiments, at least one signal of the plurality of signals corresponds with two or more unique combinations of the plurality of nucleic acid molecules. In some embodiments, the at least one signal of the plurality of signals (A) corresponds with a presence of one of the plurality of nucleic acid molecules and (B) corresponds with a presence of two of the plurality of nucleic acid molecules.

Disclosed herein, in some aspects, is a method of quantifying a first nucleic acid target and a second nucleic acid target in a sample, the method comprising: (a) providing a mixture comprising: (i) a first plurality of nucleic acid molecules derived from, and/or corresponding with, the first nucleic acid target; (ii) a second plurality of nucleic acid molecules derived from, and/or corresponding with, the second nucleic acid target; (iii) a first plurality of oligonucleotide probes, each of which corresponds to a different region of the first nucleic acid target; and (iv) a second plurality of oligonucleotide probes, each of which corresponds to a different region of the second nucleic acid target; (b) partitioning the mixture into a plurality of partitions; (c) generating a plurality of signals in the plurality of partitions, wherein the plurality of signals are detectable in one color channel; (d) detecting from multiple partitions of the plurality of partitions the plurality of signals in the color channel; and (e) based on the detecting, quantifying the first nucleic acid target and the second nucleic acid target in the sample. In some embodiments, the plurality of signals is generated by the first plurality of oligonucleotide probes and the second plurality of oligonucleotide probes. In some embodiments, at least one of the plurality of signals corresponds with a unique combination of two or more of the plurality of first nucleic acid molecules and/or the plurality of second nucleic acid molecules in a partition of the plurality of partitions. In some embodiments, the at least one of the plurality of signals uniquely corresponds with a presence of exactly two of the first plurality of nucleic acid molecules or the second plurality of nucleic acid molecules in the partition. In some embodiments, the quantifying comprises determining a ratio of the first nucleic acid target to the second nucleic acid target in the sample. In some embodiments, the quantifying comprises determining an absolute quantity of the first nucleic acid target and the second nucleic acid target in the sample. In some embodiments, the quantifying comprises determining a relative quantity of the first nucleic acid target and the second nucleic acid target in the sample, wherein the relative quantity is a quantity relative to a reference value. In some embodiments, the sample is derived from a biological sample. In some embodiments, the biological sample is blood or plasma. In some embodiments, the nucleic acid target is a chromosome. In some embodiments, the chromosome is chromosome 21, chromosome 18, chromosome 15, chromosome 13, an X chromosome, or a Y chromosome. In some embodiments, (c) comprises amplifying the plurality of nucleic acid molecules, thereby generating the plurality of signals. In some embodiments, the amplifying comprises polymerase chain reaction. In some embodiments, the amplifying degrades the plurality of oligonucleotide probes, thereby generating the plurality of signals. In some embodiments, the plurality of oligonucleotide probes are degraded by a nucleic acid enzyme, thereby releasing a signal tag from each of the plurality of oligonucleotide probes and generating the plurality of signals. In some embodiments, the plurality of signals is a plurality of fluorescent signals or a plurality of chemiluminescent signals. In some embodiments, the plurality of oligonucleotide probes each bind to a different region of the nucleic acid target. In some embodiments, at least one signal of the plurality of signals corresponds with two or more unique combinations of the first plurality of nucleic acid molecules and/or the second plurality of nucleic acid molecules.

Disclosed herein, in some aspects, is a method of quantifying target nucleic acid molecules in a sample, the method comprising: (a) partitioning a plurality of nucleic acid molecules into a plurality of partitions; (b) amplifying the plurality of nucleic acid molecules in the plurality of partitions, thereby generating a plurality of signals; (c) detecting the plurality of signals; (d) based on the detecting, determining for each partition of the plurality of partitions a probability that one or more nucleic acid molecule(s) of the plurality of nucleic acid molecules is present in the partition, thereby generating a plurality of probabilities; and (e) quantifying the target nucleic acid molecules in the sample based on a function of the plurality of probabilities. In some embodiments, the method does not include a step of determining a number of nucleic acid molecules in any individual member of the plurality of partitions. In some embodiments, the method does not include a step of determining a number of partitions comprising a nucleic acid sequence corresponding to the target nucleic acid molecules. In some embodiments, the function is a sum. In some embodiments, the plurality of nucleic acid molecules are derived from, correspond with, or are members of, the target nucleic acid molecules. In some embodiments, the amplifying comprises polymerase chain reaction. In some embodiments, the plurality of signals is a plurality of fluorescent signals or a plurality of chemiluminescent signals. In some embodiments, (a) further comprises partitioning, into the plurality of partitions, a plurality of oligonucleotide probes corresponding to the plurality of nucleic acid molecules. In some embodiments, at least a portion of the plurality of signals is generated from the plurality of oligonucleotide probes. In some embodiments, the amplifying degrades the plurality of oligonucleotide probes, thereby generating the plurality of signals. In some embodiments, the plurality of oligonucleotide probes are degraded by a nucleic acid enzyme, thereby releasing a signal tag from each of the plurality of oligonucleotide probes and generating the plurality of signals. In some embodiments, the sample is derived from a biological sample. In some embodiments, the biological sample is blood or plasma.

Disclosed herein, in some aspects, is a method of quantifying target nucleic acid molecules in a sample, the method comprising: (a) partitioning a plurality of nucleic acid molecules into a plurality of partitions; (b) amplifying the plurality of nucleic acid molecules in the plurality of partitions, thereby generating a plurality of signals; (c) detecting the plurality of signals; (d) comparing members of the plurality of signals to one another; and (e) quantifying the target nucleic acid molecules in the sample based on the comparing, the method not including a step of quantifying the plurality of nucleic acid molecules in any individual member of the plurality of partitions. In some embodiments, the comparing comprises generating one or more signal distribution curves from the plurality of signals and analyzing the one or more signal distribution curves. In some embodiments, the analyzing comprises measuring an area under the curve (AUC) for each of the one or more signal distribution curves. In some embodiments, (d) comprises comparing the AUC to a reference value. In some embodiments, the one or more signal distribution curves comprises a plurality of signal distribution curves, wherein (d) comprises comparing an AUC for each of the one or more signal distribution curves to one another. In some embodiments, the plurality of nucleic acid molecules are derived from, correspond with, or are members of, the target nucleic acid molecules. In some embodiments, the amplifying comprises polymerase chain reaction. In some embodiments, the plurality of signals is a plurality of fluorescent signals or a plurality of chemiluminescent signals. In some embodiments, (a) further comprises partitioning, into the plurality of partitions, a plurality of oligonucleotide probes corresponding to the plurality of nucleic acid molecules. In some embodiments, at least a portion of the plurality of signals is generated from the plurality of oligonucleotide probes. In some embodiments, the amplifying degrades the plurality of oligonucleotide probes, thereby generating the plurality of signals. In some embodiments, the plurality of oligonucleotide probes are degraded by a nucleic acid enzyme, thereby releasing a signal tag from each of the plurality of oligonucleotide probes and generating the plurality of signals. In some embodiments, the sample is derived from a biological sample. In some embodiments, the biological sample is blood or plasma.

Disclosed herein, in some aspects, is a method of determining a quantity of a first target nucleic acid relative to a quantity of a second target nucleic acid in a sample, the method comprising: (a) providing a mixture comprising: (i) a first plurality of nucleic acid molecules derived from, and/or corresponding with, the first target nucleic acid; and (ii) a second plurality of nucleic acid molecules derived from, and/or corresponding with, the second target nucleic acid; (b) partitioning the mixture into a plurality of partitions; (c) amplifying the first plurality of nucleic acid molecules and the second plurality of nucleic acid molecules in the plurality of partitions, thereby generating a plurality of signals; (d) detecting the plurality of signals; and (e) based on the detecting, determining a ratio representative of a quantity of the first target nucleic acid relative to a quantity of the second target nucleic acid in the sample, the method not including a step of quantifying, in any individual member of the plurality of partitions, the first plurality of nucleic acid molecules or the second plurality of nucleic acid molecules. In some embodiments, the method further comprises, based on the ratio, quantifying the first target nucleic acid and the second target nucleic acid in the sample. In some embodiments, the ratio is representative of a fetal fraction. In some embodiments, the first nucleic acid target is a first chromosome. In some embodiments, the second nucleic acid target is a second chromosome. In some embodiments, the first nucleic acid target is derived from a first organism. In some embodiments, the second nucleic acid target is derived from a second organism. In some embodiments, the amplifying comprises polymerase chain reaction. In some embodiments, the plurality of signals is a plurality of fluorescent signals or a plurality of chemiluminescent signals. In some embodiments, the sample further comprises (iii) a first plurality of oligonucleotide probes corresponding to the first plurality of nucleic acid molecules and (iv) a second plurality of oligonucleotide probes corresponding to the second plurality of nucleic acid molecules. In some embodiments, at least a portion of the plurality of signals are generated from the first plurality of oligonucleotide probes and the second plurality of oligonucleotide probes. In some embodiments, the amplifying degrades the first plurality of oligonucleotide probes and the second plurality of oligonucleotide probes, thereby generating the plurality of signals. In some embodiments, the first plurality of oligonucleotide probes and the second plurality of oligonucleotide probes are degraded by a nucleic acid enzyme, thereby releasing a signal tag from each of the plurality of oligonucleotide probes and generating the plurality of signals. In some embodiments, (d) comprises generating a signal map from the plurality of signals. In some embodiments, the signal map comprises an overlapping region. In some embodiments, the signal map comprises a plurality of target populations. In some embodiments, at least a portion of the plurality of target populations overlap with one another. In some embodiments, the ratio is calculated using a peak minimum thresholding model. In some embodiments, the ratio is calculated using a midpoint thresholding model. In some embodiments, the ratio is calculated using a partial probability summation model. In some embodiments, the ratio is calculated using a direct probability summation model. In some embodiments, the sample is derived from a biological sample. In some embodiments, the biological sample is blood or plasma. In some embodiments, the first plurality of nucleic acid molecules are copies of the first nucleic acid target, and wherein the first plurality of nucleic acid molecules have been transferred from the sample into the mixture. In some embodiments, the second plurality of nucleic acid molecules are copies of the second nucleic acid target, and wherein the second plurality of nucleic acid molecules have been transferred from the sample into the mixture. In some embodiments, the first plurality of nucleic acid molecules and the second plurality of nucleic acid molecules originate from the sample. In some embodiments, the first plurality of nucleic acid molecules are products of a nucleic acid amplification of the first target nucleic acid. In some embodiments, the second plurality of nucleic acid molecules are products of a nucleic acid amplification of the second target nucleic acid. In some embodiments, the first plurality of nucleic acid molecules are products of a nucleic acid extension of the first target nucleic acid. In some embodiments, the second plurality of nucleic acid molecules are products of a nucleic acid extension of the second target nucleic acid. In some embodiments, the first plurality of nucleic acid molecules are products of a reverse transcription of the first target nucleic acid. In some embodiments, the second plurality of nucleic acid molecules are products of a reverse transcription of the second target nucleic acid.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3A shows a scatter plot of droplets from three wells of an experiment aligning against one of four clusters: (1) No target (2) Pan FluA target (3) FluA H3 subtype target (4) Both Pan FluA and FluAH3 targets. FIG. 3B shows a contour plot identifying distinct clusters. FIG. 3C shows a density plot of the x-axis shows four distinct clusters, wherein individual droplets from each cannot be identified and the number of droplets for each cluster cannot be identified with a standard "cutoff" method.

FIG. 4 illustrates methods of estimating target quantities.

FIGS. 11A-C demonstrate the ability to differentiate between RSVA and Rhinovirus (RhV) by measuring the sums of target signals.

FIGS. 15A-C show an example of basic single channel multiplexing with digital PCR.

FIGS. 18A-D demonstrate the ability to quantitate 40,000 copies of chromosome 18 and 40,000 copies of chromosome 21 in an approximate 20,000 partition reaction.

DETAILED DESCRIPTION

Figure 1:
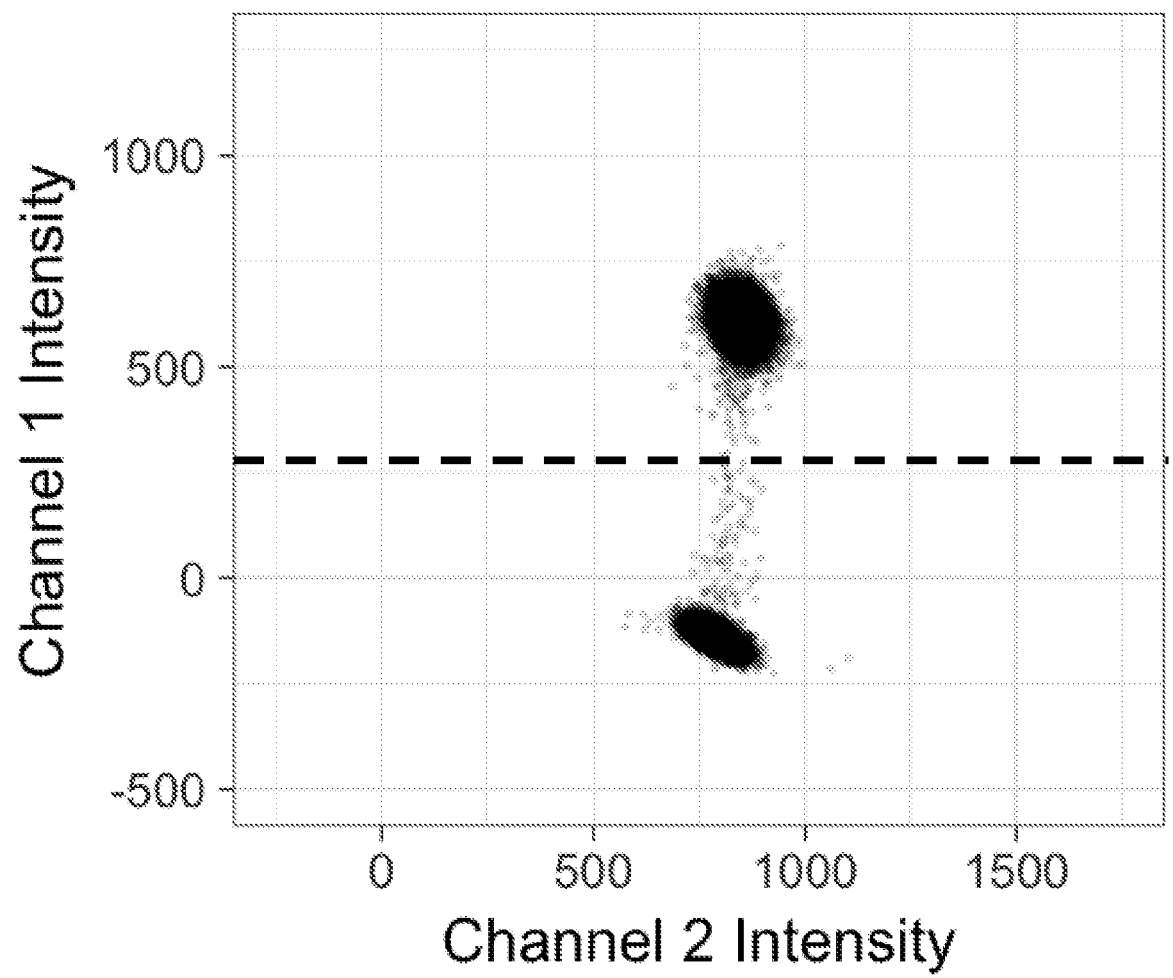
FIG. 1 illustrates an example signal presence in a dPCR assay.

The following description provides specific details for a comprehensive understanding of, and enabling description for, various embodiments of the technology. It is intended that the terminology used be interpreted in its broadest reasonable manner, even where it is being used in conjunction with a detailed description of certain embodiments.

Before describing the present teachings in detail, it is to be understood that the disclosure is not limited to specific compositions or process steps, and as such, may vary. As used herein, the singular forms "a," "an," and "the" are intended to include the plural forms as well, unless the context clearly indicates otherwise. Furthermore, to the extent that the terms "including," "includes," "having," "has," "with," "such as," or variants thereof, are used in either the specification and/or the claims, such terms are not limiting and are intended to be inclusive in a manner similar to the term "comprising." Unless specifically noted, embodiments in the specification that recite "comprising" various components are also contemplated as "consisting of" or "consisting essentially of" the recited components.

Polymerase Chain Reaction (PCR) is a method of exponential amplification of specific nucleic acid target in a reaction mix with a nucleic acid polymerase and primers. Primers are short single stranded oligonucleotides which are complementary to the 3' sequences of the positive and negative strand of the target sequence. The reaction mix is cycled in repeated heating and cooling steps. The heating cycle denatures or splits a double stranded nucleic acid target into single stranded templates. In the cooling cycle, the primers bind to complementary sequence on the template. After the template is primed the nucleic acid polymerase creates a copy of the original template. Repeated cycling exponentially amplifies the target 2 fold with each cycle leading to approximately a billion-fold increase of the target sequence in 30 cycles (Saiki et al 1988).

Digital PCR (dPCR) is a process of partitioning a sample containing one or more targets into a plurality of partitions (e.g., wells, droplets, etc.), performing a PCR reaction in each partition, and recording the luminescence (e.g., fluorescence) generated by, for example, a target-specific reporter probe. The use of labeled oligonucleotide probes enables specific detection. dPCR may be used in a variety of nucleic acid detection methods. Digital PCR is generally performed on a digital PCR instrument that measures the fluorescence from each partition in an optical channel through one or more excitation/emission filter sets.

Frequently, the target-specific oligonucleotide probe is a short oligonucleotide complementary to one strand of the amplified target. The probe lacks a 3' hydroxyl and therefore is not extendable by the DNA polymerase. TaqMan (ThermoFisher Scientific) chemistry is a common reporter probe method used for multiplex Real-Time PCR (Holland et al. 1991). The TaqMan oligonucleotide probe is covalently modified with a fluorophore and a quenching tag (i.e., quencher). In this configuration the fluorescence generated by the fluorophore is quenched and is not detected by the real time PCR instrument. When the target of interest is present, the probe oligonucleotide base pairs with the amplified target. While bound, it is digested by the 5' to 3' exonuclease activity of the Taq polymerase thereby physically separating the fluorophore from the quencher and liberating signal for detection by the real time PCR instrument.

Multiplex analysis of multiple nucleic acid targets in a single measurement may be performed by encoding each nucleic acid target to a unique intensity value or range of values. For example, for detection of multiple nucleic acid targets in a sample using a single measurement, oligonucleotide probes may be provided at varying concentrations, such that the intensity of each signal generated from the probes, both individually and in combination, is unique.

Overview

In one example of dPCR, a single sample containing at least one nucleic acid target sequence, at least one amplification oligomer, at least one detection oligonucleotide, dNTPs, a thermostable DNA polymerase, and other PCR reagents may be partitioned into approximately 20,000 evenly sized partitions. Generally, each partition may receive a single template of the nucleic acid target sequence. However, statistically, some partitions may receive more than one copy of a nucleic acid target template, while other partitions may not receive any target template.

Following partitioning, each partition may be subject to end-point PCR. Partitions emitting a fluorescent signal are marked "positive" and scored as "1," whereas partitions without detectable fluorescence are deemed "negative" and scored as "0." The underlining theory of dPCR is that the number of positive reactions is directly proportional to the total number of template nucleic acid present in the sample—thus enabling absolute quantification. However, because some partitions will receive more than one nucleic acid target template during partitioning, if uncorrected, the proportion of positive partitions will not accurately reflect the precise quantity of nucleic acid target present in the sample. Thus, a Poisson statistical model may be used to calculate the probability of a given reaction receiving zero, one, two, three or more copies. This "correction" may enable all molecules in the starting sample to be accounted for, yielding absolute quantification. For a single target amplification, the quantity of nucleic acid in terms of average number of copies per partition (k) can be determined by $\lambda = -\ln(P(k=0))$.

When the result of amplification of each partition is visualized as a two-dimensional scatter plot (whereby fluorescent amplitudes in two color channels are plotted against each other), the resulting fluorescent "clusters" may be indicative of the relative amount of the specific nucleic acid target sequence in the sample results.

When multiplexing multiple targets into two channels of a digital PCR reaction, there may be overlap between many of the final states. For example, in an experiment where each detection probe utilizes a reporter dye (e.g., FAM and HEX), when plotted, the clusters will comprise HEX-positive, FAM-positive, double-positive, and double-negative (empty) clusters. However, in practice, not all partitions provide definitively positive, or negative, results. Ambiguous partitions are generally observed between clusters on a two-dimensional scatter plot. Ambiguous signals may be present between clusters in the same color channel. Ambiguous signals may be present between clusters in different color channels. The presence of ambiguous signals, falling between distinctly positive and distinctly negative populations, may prevent precise quantification. FIG. 1 illustrates signal presence for a single target (RSVB) in an example dPCR assay. FIG. 1 reveals the presence of ambiguous signals in between clusters (e.g., those which may correspond with either the presence or the absence of target nucleic acid sequence in a partition). Recognized herein is a need for quantification methods which account for ambiguous signals.

In some aspects, the present disclosure provides methods, systems, and compositions for multiplex quantification using digital assays, wherein individual partitions need not be classified to quantify targets present in a reaction. The disclosed methods may be useful in identifying or detecting genetic abnormalities from a subject, for example, fetal aneuploidy (e.g., trisomy 21, trisomy 18, etc.).

In some aspects, the present disclosure provides dPCR methods of multiplex quantitation for non-invasive prenatal diagnosis of aneuploidies. As cell-free fetal DNA (cffDNA) accounts for only a small percentage of the total cell-free DNA in maternal plasma, partitioning a sample into approximately 20,000 evenly sized individual partitions—each about one nanoliter in volume—may be used for absolute quantification with high specificity and sensitivity without the need to classify or quantify the concentration of target sequences present in individual partitions in the reaction. Methods for quantification are described in more detail elsewhere herein, and include, for example, peak minimum thresholding, midpoint thresholding, partial probability summation, and direct probability summation. In one example, multiple nucleic acid sequences (e.g., loci) corresponding with chromosome 21 are amplified, and the set of signals generated by all the sequences are detected in a single color channel, without ever determining the quantity of any of the individual sequences in any individual partition. In parallel, multiple nucleic acid sequences (e.g., loci) corresponding with chromosome 18 are amplified, and the set of signals generated by all the sequences are detected in a single color channel, without ever determining the quantity of any of the individual sequences in any individual partition. These two sets of signals are then compared. In some cases, a ratio of chromosome 21 to chromosome 18 is determined. Determining a ratio may be useful in identifying an increase or decrease in an amount of a chromosome in a sample (e.g., cffDNA) relative to a reference value (e.g., maternal DNA).

In an example embodiment, multiple sequences (e.g., loci) corresponding with chromosome 21 are amplified and a first sum signal generated by all sequences is determined, without ever determining the quantity of any of the individual sequences. In parallel, multiple sequences (e.g., loci) corresponding with chromosome 18 are amplified and a second sum signal generated by all sequences is determined, without ever determining the quantity of any of the individual sequences. These first and second sum signals are then compared, and a ratio is determined. Therefore, if the sum signal from four chromosome 21 sequences is determined to be 500 units, and the sum signal from four chromosome 18 sequences is determined to be 300 units, then a chromosome 21:chromosome 18 ratio of 1.6 is determined.

Quantifying Target Nucleic Acid

Described herein, in some aspects, is a method of quantifying a nucleic acid target in a sample. First, a mixture may be provided comprising a plurality of nucleic acid molecules and a plurality of oligonucleotide probes. The plurality of nucleic acid molecules may be derived from, and/or may correspond with, the nucleic acid target in the sample. The plurality of oligonucleotide probes may each correspond to a different region of the nucleic acid target. The mixture may further comprise other reagents (e.g., amplification reagents) including, for example, oligonucleotide primers, dNTPs, a nucleic acid enzyme (e.g., a polymerase), and salts (e.g., $Ca^{2+}$, $Mg^{2+}$, etc.). Next, the mixture may be partitioned into a plurality of partitions (e.g., wells, microwells, droplets, etc.). Next, a plurality of signals may be generated in the plurality of partitions. The plurality of signals may be detectable in one color channel. The plurality of signals may be detectable in multiple color channels. At least one signal of the plurality of signals may correspond with the presence of a unique combination of two or more of the plurality of nucleic acid molecules in a single partition. For example, one signal may correspond to the presence of two nucleic acid molecules (e.g., two copies of a nucleic acid sequence) in a single droplet. Next, the plurality of signals may be detected in multiple partitions of the plurality of partitions. The plurality of signals may be detected in a single color channel. The plurality of signals may be detected in multiple color channels. Based on the detecting, the nucleic acid target in the sample may be quantified.

In some cases, the sample further comprises an additional plurality of nucleic acid molecules and an additional plurality of oligonucleotide probes. The additional plurality of nucleic acid molecules may be derived from and/or correspond with an additional nucleic acid target. The additional plurality of oligonucleotide probes may each correspond to a different region of the additional nucleic acid target.

A sample may be a biological sample. A sample may be derived from a biological sample. A biological sample may be, for example, blood, plasma, serum, urine, saliva, mucosal excretions, sputum, stool or tears. A biological sample may be a fluid sample. A fluid sample may be blood or plasma. A biological sample may comprise cell-free nucleic acid (e.g., cell-free RNA, cell-free DNA, etc.).

A nucleic acid target may be a nucleic acid from a pathogen (e.g., virus, bacteria, etc.). A nucleic acid target may be a nucleic acid (e.g., a chromosome) suspected of comprising one or more mutations. A nucleic acid target may be a cancer nucleic acid. A nucleic acid target may be a chromosome. Oligonucleotide probes may correspond to different regions (e.g., loci) of a chromosome. A chromosome may be chromosome 21, chromosome 18, chromosome 15, chromosome 13, an X chromosome, or a Y chromosome.

The plurality of signals may be generated by one or more of the plurality of probes from the mixture. The plurality of signals may be generated by nucleic acid amplification (e.g., PCR) of the plurality of nucleic acid molecules. Nucleic acid amplification may degrade the plurality of oligonucleotide probes (e.g., by activity of a nucleic acid enzyme), thereby generating the plurality of signals. A plurality of signals may be a plurality of fluorescent signals, a plurality of chemiluminescent signals, or a combination thereof.

A signal of the plurality of signals may correspond with two or more unique combinations of the plurality of nucleic acid molecules in a single partition (e.g., may be an ambiguous signal). For example, a signal may correspond with the presence of one nucleic acid molecule and may also correspond with the presence of two nucleic acid molecules.

In some cases, the method does not include a step of determining a number of nucleic acid molecules in any individual member of the plurality of partitions. Quantifying the nucleic acid target in the sample may comprise accounting for an ambiguous signal. Quantifying may comprise use of a peak minimum thresholding model. Quantifying may comprise use of a midpoint thresholding model. Quantifying may comprise use of a partial probability summation model. Quantifying may comprise use of a direct probability summation model.

Quantifying Multiple Target Nucleic Acids

Described herein, in some aspects, is a method of quantifying multiple nucleic acid targets in a sample. First, a mixture may be provided comprising a first plurality of nucleic acid molecules, a second plurality of nucleic acid molecules, a first plurality of oligonucleotide probes, and a second plurality of oligonucleotide probes. The first plurality of nucleic acid molecules may be derived from, and/or may correspond with, the first nucleic acid target in the sample. The second plurality of nucleic acid molecules may be derived from, and/or may correspond with, the second nucleic acid target in the sample. The first plurality of oligonucleotide probes may each correspond to a different region of the first nucleic acid target. The second plurality of oligonucleotide probes may each correspond to a different region of the second nucleic acid target. The mixture may further comprise other reagents (e.g., amplification reagents) including, for example, oligonucleotide primers, dNTPs, a nucleic acid enzyme (e.g., a polymerase), and salts (e.g., $Ca^{2+}$, $Mg^{2+}$, etc.). Next, the mixture may be partitioned into a plurality of partitions (e.g., wells, microwells, droplets, etc.). Next, a plurality of signals may be generated in the plurality of partitions. The plurality of signals may be detectable in one color channel. The plurality of signals may be detectable in multiple color channels. Next, the plurality of signals may be detected in multiple partitions of the plurality of partitions. The plurality of signals may be detected in a single color channel. The plurality of signals may be detected in multiple color channels. Based on the detecting, the first nucleic acid target and the second nucleic acid target in the sample may be quantified.

The plurality of signals may be generated by one or more of the first plurality of probes and/or the second plurality of probes from the mixture. The plurality of signals may be generated by nucleic acid amplification (e.g., PCR) of the first plurality of nucleic acid molecules and/or the second plurality of nucleic acid molecules. Nucleic acid amplification may degrade the first and second pluralities of oligonucleotide probes (e.g., by activity of a nucleic acid enzyme), thereby generating the plurality of signals. A plurality of signals may be a plurality of fluorescent signals, a plurality of chemiluminescent signals, or a combination thereof.

Quantifying the first and second nucleic acid targets may comprise determining a ratio of the first nucleic acid target to the second nucleic acid target in the sample (e.g., the quantity of the first nucleic acid target relative to the quantity of the second nucleic acid target in the sample). Quantifying the first and second nucleic acid targets may comprise determining an absolute quantity of the first and second nucleic acid targets in the sample. Quantifying the first and second nucleic acid targets may comprise determining a relative quantity of the first and second nucleic acid targets in the sample.

A sample may be a biological sample. A sample may be derived from a biological sample. A biological sample may be, for example, blood, plasma, serum, urine, saliva, mucosal excretions, sputum, stool or tears. A biological sample may be a fluid sample. A fluid sample may be blood or plasma. A biological sample may comprise cell-free nucleic acid (e.g., cell-free RNA, cell-free DNA, etc.).

A nucleic acid target may be a nucleic acid from a pathogen (e.g., virus, bacteria, etc.). A nucleic acid target may be a nucleic acid (e.g., a chromosome) suspected of comprising one or more mutations. A nucleic acid target may be a cancer nucleic acid. A nucleic acid target may be a chromosome. Oligonucleotide probes may correspond to different regions (e.g., loci) of a chromosome. A chromosome may be chromosome 21, chromosome 18, chromosome 15, chromosome 13, an X chromosome, or a Y chromosome.

At least one signal of the plurality of signals may correspond with the presence of a unique combination of two or more of the first or second pluralities of nucleic acid molecules in a single partition. For example, one signal may correspond to the presence of two nucleic acid molecules (e.g., two copies of a nucleic acid sequence) in a single droplet. A signal of the plurality of signals may correspond with two or more unique combinations of the first or second pluralities of nucleic acid molecules in a single partition (e.g., may be an ambiguous signal). For example, a signal may correspond with the presence of one nucleic acid molecule and may also correspond with the presence of two nucleic acid molecules.

In some cases, the method does not include a step of determining a number of nucleic acid molecules in any individual member of the plurality of partitions. Quantifying the nucleic acid target in the sample may comprise accounting for an ambiguous signal. Quantifying may comprise use of a peak minimum thresholding model. Quantifying may comprise use of a midpoint thresholding model. Quantifying may comprise use of a partial probability summation model. Quantifying may comprise use of a direct probability summation model.

Quantifying Target Nucleic Acid Molecules Using Probability Determination

Described herein, in some aspects, is a method of quantifying target nucleic acid molecules in a sample. First a plurality of nucleic acid molecules may be partitioned into a plurality of partitions (e.g., microwells, wells, droplets, etc.). The plurality of nucleic acid molecules may be derived from, and/or may correspond with, the target nucleic acid molecules in the sample. In addition to the plurality of nucleic acid molecules, other reagents (e.g., amplification reagents) may be partitioned, including, for example, oligonucleotide primers, oligonucleotide probes, dNTPs, a nucleic acid enzyme (e.g., a polymerase), and salts (e.g., $Ca^{2+}$, $Mg^{2+}$, etc.). Next, the plurality of nucleic acid molecules may be amplified, thereby generating a plurality of signals. The plurality of signals may be detectable in one color channel. The plurality of signals may be detectable in multiple color channels. Next, the plurality of signals may be detected. The plurality of signals may be detected in a single color channel. The plurality of signals may be detected in multiple color channels. Next, for each partition of the plurality of partitions, a probability that one or more nucleic acid molecule(s) of the plurality of nucleic acid molecules is present may be determined, thereby generating a plurality of probabilities. The plurality of probabilities may be generated based on the detecting (e.g., based on analysis of detected signals). The target nucleic acid molecules in the sample may be quantified based on a function of the plurality of probabilities.

The function of the plurality of probabilities may be a sum. In this case, quantifying the target nucleic acid molecules may comprise calculating a sum of all of the plurality of probabilities. The function of the plurality of probabilities may be a function derived from the properties (e.g., size, shape, width, etc.) of the signal generated from each partition. For example, a function may be generated based on the width of each signal and used to quantify the plurality of target nucleic acid molecules.

The method may further comprise partitioning, into the plurality of partitions, a plurality of oligonucleotide probes corresponding to the plurality of nucleic acid molecules. The plurality of signals may be generated from the plurality of oligonucleotide probes. The plurality of signals may be generated by nucleic acid amplification (e.g., PCR) of the plurality of nucleic acid molecules. Nucleic acid amplification may degrade the plurality of oligonucleotide probes (e.g., by activity of a nucleic acid enzyme), thereby generating the plurality of signals. Nucleic acid amplification may release a signal tag from the plurality of probes, thereby generating the plurality of signals. A plurality of signals may be a plurality of fluorescent signals, a plurality of chemiluminescent signals, or a combination thereof.

A sample may be a biological sample. A sample may be derived from a biological sample. A biological sample may be, for example, blood, plasma, serum, urine, saliva, mucosal excretions, sputum, stool or tears. A biological sample may be a fluid sample. A fluid sample may be blood or plasma. A biological sample may comprise cell-free nucleic acid (e.g., cell-free RNA, cell-free DNA, etc.).

A nucleic acid target may be a nucleic acid from a pathogen (e.g., virus, bacteria, etc.). A nucleic acid target may be a nucleic acid (e.g., a chromosome) suspected of comprising one or more mutations. A nucleic acid target may be a cancer nucleic acid. A nucleic acid target may be a chromosome. Oligonucleotide probes may correspond to different regions (e.g., loci) of a chromosome. A chromosome may be chromosome 21, chromosome 18, chromosome 15, chromosome 13, an X chromosome, or a Y chromosome.

At least one signal of the plurality of signals may correspond with the presence of a unique combination of two or more of the plurality of nucleic acid molecules in a single partition. For example, one signal may correspond to the presence of two nucleic acid molecules (e.g., two copies of a nucleic acid sequence) in a single droplet. A signal of the plurality of signals may correspond with two or more unique combinations of the plurality of nucleic acid molecules in a single partition (e.g., may be an ambiguous signal). For example, a signal may correspond with the presence of one nucleic acid molecule and may also correspond with the presence of two nucleic acid molecules.

Quantifying the target nucleic acid molecules may comprise determining a ratio of a first nucleic acid target to a second nucleic acid target in the sample (e.g., the quantity of the first nucleic acid target relative to the quantity of the second nucleic acid target in the sample). Quantifying the target nucleic acid molecules may comprise determining an absolute quantity of the target nucleic acid molecules in the sample. Quantifying the first and second nucleic acid targets may comprise determining a relative quantity of target nucleic acid molecules in the sample.

The method may not include a step of determining a number of nucleic acid molecules in any individual member of the plurality of partitions. The method may not include a step of determining a number of partitions comprising a nucleic acid sequence corresponding to the target nucleic acid molecules. The method may not include any step of determining a quantity from any individual partition of the plurality of partitions. Quantifying the target nucleic acid molecules in the sample may comprise accounting for an ambiguous signal. Quantifying may comprise use of a peak minimum thresholding model. Quantifying may comprise use of a midpoint thresholding model. Quantifying may comprise use of a partial probability summation model. Quantifying may comprise use of a direct probability summation model.

Quantifying Target Nucleic Acid Molecules Using Direct Analysis

Described herein, in some aspects, is a method of quantifying target nucleic acid molecules in a sample. First a plurality of nucleic acid molecules may be partitioned into a plurality of partitions (e.g., microwells, wells, droplets, etc.). The plurality of nucleic acid molecules may be derived from, and/or may correspond with, the target nucleic acid molecules in the sample. In addition to the plurality of nucleic acid molecules, other reagents (e.g., amplification reagents) may be partitioned, including, for example, oligonucleotide primers, oligonucleotide probes, dNTPs, a nucleic acid enzyme (e.g., a polymerase), and salts (e.g., $Ca^{2+}$, $Mg^{2+}$, etc.). Next, the plurality of nucleic acid molecules may be amplified, thereby generating a plurality of signals. The plurality of signals may be detectable in one color channel. The plurality of signals may be detectable in multiple color channels. Next, the plurality of signals may be detected. The plurality of signals may be detected in a single color channel. The plurality of signals may be detected in multiple color channels. Next, the members of the plurality of signals may be compared to one another. The target nucleic acid molecules in the sample may be quantified based on the comparing. The method may not include a step of quantifying the plurality of nucleic acid molecules in any individual member of the plurality of partitions.

Comparing members of a plurality of signals to one another may comprise generating one or more signal distribution curves from the plurality of signals and analyzing the one or more signal distribution curves. Comparing may comprise measuring an area under the curve (AUC) for one or more signal distribution curves generated from the plurality of signals. The comparing may comprise comparing an AUC to a reference value. The comparing may comprise generating one or more signal distribution curves and comparing an AUC for each of the one or more signal distribution curves to one another.

The method may further comprise partitioning, into the plurality of partitions, a plurality of oligonucleotide probes corresponding to the plurality of nucleic acid molecules. The plurality of signals may be generated from the plurality of oligonucleotide probes. The plurality of signals may be generated by nucleic acid amplification (e.g., PCR) of the plurality of nucleic acid molecules. Nucleic acid amplification may degrade the plurality of oligonucleotide probes (e.g., by activity of a nucleic acid enzyme), thereby generating the plurality of signals. Nucleic acid amplification may release a signal tag from the plurality of probes, thereby generating the plurality of signals. A plurality of signals may be a plurality of fluorescent signals, a plurality of chemiluminescent signals, or a combination thereof.

A sample may be a biological sample. A sample may be derived from a biological sample. A biological sample may be, for example, blood, plasma, serum, urine, saliva, mucosal excretions, sputum, stool or tears. A biological sample may be a fluid sample. A fluid sample may be blood or plasma. A biological sample may comprise cell-free nucleic acid (e.g., cell-free RNA, cell-free DNA, etc.).

A nucleic acid target may be a nucleic acid from a pathogen (e.g., virus, bacteria, etc.). A nucleic acid target may be a nucleic acid (e.g., a chromosome) suspected of comprising one or more mutations. A nucleic acid target may be a cancer nucleic acid. A nucleic acid target may be a chromosome. Oligonucleotide probes may correspond to different regions (e.g., loci) of a chromosome. A chromosome may be chromosome 21, chromosome 18, chromosome 15, chromosome 13, an X chromosome, or a Y chromosome.

At least one signal of the plurality of signals may correspond with the presence of a unique combination of two or more of the plurality of nucleic acid molecules in a single partition. For example, one signal may correspond to the presence of two nucleic acid molecules (e.g., two copies of a nucleic acid sequence) in a single droplet. A signal of the plurality of signals may correspond with two or more unique combinations of the plurality of nucleic acid molecules in a single partition (e.g., may be an ambiguous signal). For example, a signal may correspond with the presence of one nucleic acid molecule and may also correspond with the presence of two nucleic acid molecules.

Quantifying the target nucleic acid molecules may comprise determining a ratio of a first nucleic acid target to a second nucleic acid target in the sample (e.g., the quantity of the first nucleic acid target relative to the quantity of the second nucleic acid target in the sample). Quantifying the target nucleic acid molecules may comprise determining an absolute quantity of the target nucleic acid molecules in the sample. Quantifying the first and second nucleic acid targets may comprise determining a relative quantity of target nucleic acid molecules in the sample.

The method may not include a step of determining a number of nucleic acid molecules in any individual member of the plurality of partitions. The method may not include a step of determining a number of partitions comprising a nucleic acid sequence corresponding to the target nucleic acid molecules. The method may not include any step of determining a quantity from any individual partition of the plurality of partitions. Quantifying the target nucleic acid molecules in the sample may comprise accounting for an ambiguous signal. Quantifying may comprise use of a peak minimum thresholding model. Quantifying may comprise use of a midpoint thresholding model. Quantifying may comprise use of a partial probability summation model. Quantifying may comprise use of a direct probability summation model.

Determining a Ratio

Described herein, in some aspects, is a method of determining a quantify of a first target nucleic acid relative to a quantity of a second target nucleic acid in a sample. First, a mixture may be provided comprising a first plurality of nucleic acid molecules and a second plurality of nucleic acid molecules. The first plurality of nucleic acid molecules may be derived from, and/or may correspond with, the first nucleic acid target in the sample. The second plurality of nucleic acid molecules may be derived from, and/or may correspond with, the second nucleic acid target in the sample. In addition to the first and second pluralities of nucleic acid molecules, other reagents (e.g., amplification reagents) may be provided in the mixture, including, for example, oligonucleotide primers, oligonucleotide probes, dNTPs, a nucleic acid enzyme (e.g., a polymerase), and salts (e.g., $Ca^{2+}$, $Mg^{2+}$, etc.). Next, the mixture may be partitioned into a plurality of partitions (e.g., microwells, wells, droplets, etc.). Next, the first plurality of nucleic acid molecules and the second plurality of nucleic acid molecules may be amplified, thereby generating a plurality of signals. The plurality of signals may be detectable in one color channel. The plurality of signals may be detectable in multiple color channels. Next, the plurality of signals may be detected. The plurality of signals may be detected in a single color channel. The plurality of signals may be detected in multiple color channels. Next, based on the detecting, a ratio may be determined which is representative of a quantity of the first target nucleic acid relative to a quantity of the second target nucleic acid in the sample. The method may not include a step of quantifying, in any individual member of said plurality of partitions, the first plurality of nucleic acid molecules or the second plurality of nucleic acid molecules. The first target nucleic acid and the second target nucleic acid in the sample may be quantified based on the ratio.

The method may further comprise partitioning, into the plurality of partitions, a plurality of oligonucleotide probes corresponding to the plurality of nucleic acid molecules. The plurality of signals may be generated from the plurality of oligonucleotide probes. The plurality of signals may be generated by nucleic acid amplification (e.g., PCR) of the plurality of nucleic acid molecules. Nucleic acid amplification may degrade the plurality of oligonucleotide probes (e.g., by activity of a nucleic acid enzyme), thereby generating the plurality of signals. Nucleic acid amplification may release a signal tag from the plurality of probes, thereby generating the plurality of signals. A plurality of signals may be a plurality of fluorescent signals, a plurality of chemiluminescent signals, or a combination thereof.

A ratio may be representative of a fetal fraction. A ratio may be a fetal fraction. A ratio may be representative or indicative of a chromosomal abnormality. A chromosomal abnormality may be an aneuploidy. An aneuploidy may be a fetal aneuploidy. A chromosomal abnormality may be a mutation (e.g., insertion, deletion, point mutation, translocation, amplification, etc.).

A sample may be a biological sample. A sample may be derived from a biological sample. A biological sample may be, for example, blood, plasma, serum, urine, saliva, mucosal excretions, sputum, stool or tears. A biological sample may be a fluid sample. A fluid sample may be blood or plasma. A biological sample may comprise cell-free nucleic acid (e.g., cell-free RNA, cell-free DNA, etc.).

A nucleic acid target may be a nucleic acid from a pathogen (e.g., virus, bacteria, etc.). A nucleic acid target may be a nucleic acid (e.g., a chromosome) suspected of comprising one or more mutations. A nucleic acid target may be a cancer nucleic acid. A nucleic acid target may be a chromosome. Oligonucleotide probes may correspond to different regions (e.g., loci) of a chromosome. A chromosome may be chromosome 21, chromosome 18, chromosome 15, chromosome 13, an X chromosome, or a Y chromosome.

At least one signal of the plurality of signals may correspond with the presence of a unique combination of two or more of the first or second pluralities of nucleic acid molecules in a single partition. For example, one signal may correspond to the presence of two nucleic acid molecules (e.g., two copies of a nucleic acid sequence) in a single droplet. A signal of the plurality of signals may correspond with two or more unique combinations of the first or second pluralities of nucleic acid molecules in a single partition (e.g., may be an ambiguous signal). For example, a signal may correspond with the presence of one nucleic acid molecule and may also correspond with the presence of two nucleic acid molecules.

Determining the ratio may comprise generating a signal map from the plurality of signals. A signal map may be a graph or other display representative of properties of a signal (e.g., wavelength, amplitude, etc.). A signal map may comprise a plurality of target populations. A signal map may comprise an overlapping region between each of the plurality of target populations. At least a portion of the plurality of target populations overlap with one another.

In some cases, the method does not include a step of determining a number of nucleic acid molecules in any individual member of the plurality of partitions. Quantifying the first and second nucleic acid target in the sample may comprise accounting for an ambiguous signal. Quantifying may comprise use of a peak minimum thresholding model. Quantifying may comprise use of a midpoint thresholding model. Quantifying may comprise use of a partial probability summation model. Quantifying may comprise use of a direct probability summation model.

The first plurality of nucleic acid molecules may be copies of the first nucleic acid target, where the copies have been transferred from the sample into the mixture. The second plurality of nucleic acid molecules may be copies of the second nucleic acid target, where the copies have been transferred from the sample into the mixture. The first plurality of nucleic acid molecules and the second plurality of nucleic acid molecules may originate from the sample. The first plurality of nucleic acid molecules may be products of nucleic acid amplification (e.g., PCR) of the first target nucleic acid. The second plurality of nucleic acid molecules may be products of nucleic acid amplification (e.g., PCR) of the second target nucleic acid. The first plurality of nucleic acid molecules may be products of nucleic acid extension of the first target nucleic acid. The second plurality of nucleic acid molecules may be products of nucleic acid extension of the second target nucleic acid. The first plurality of nucleic acid molecules may be products of reverse transcription of the first target nucleic acid. The second plurality of nucleic acid molecules may be products of nucleic acid extension of the second target nucleic acid.

Multiplex Calibration

Figure 2:
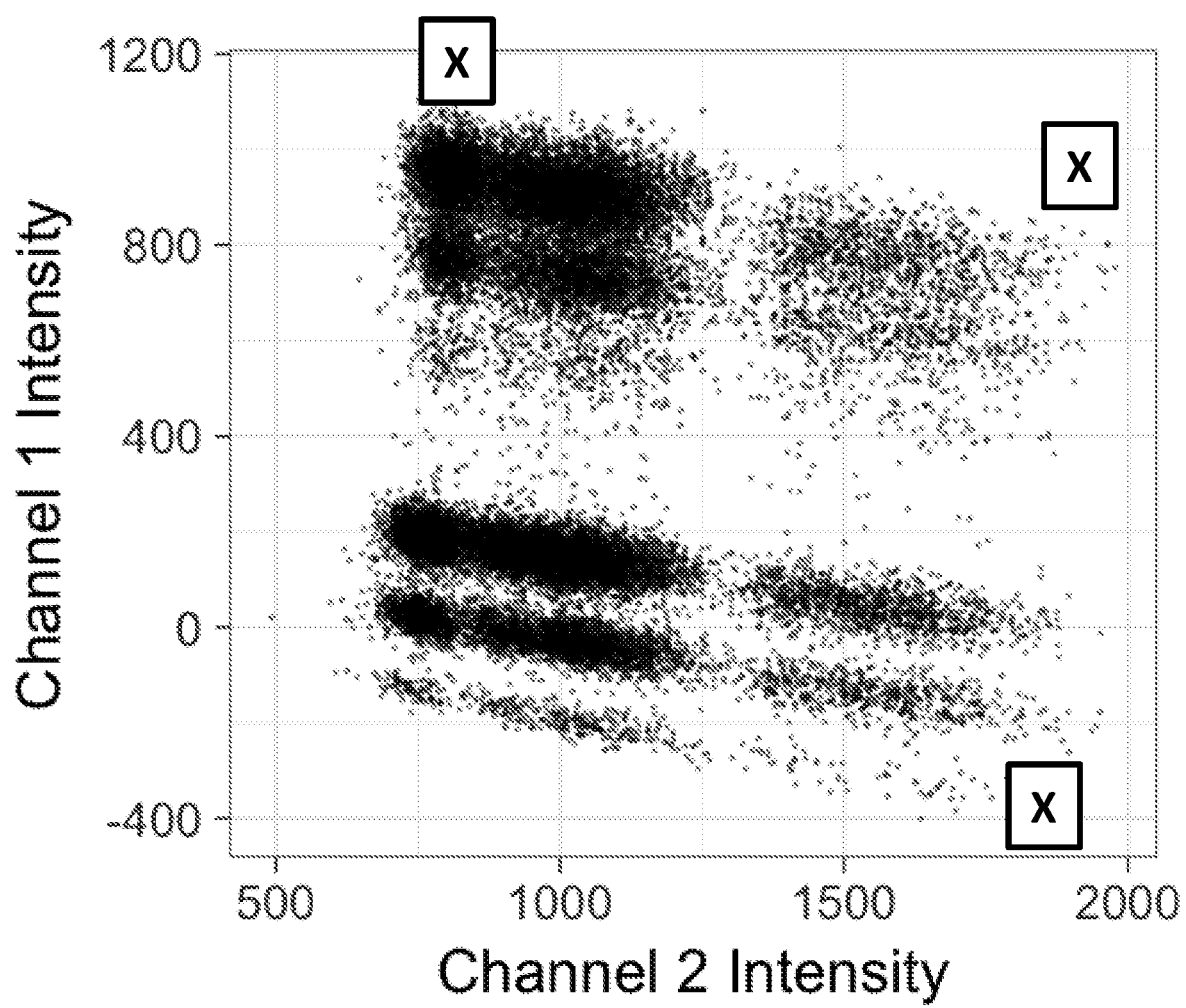
FIG. 2 illustrates an example method for using synthetic or natural targets in a formulation for digital PCR to calibrate the location of multiple clusters in a multiplexed approach.

When multiplexing, dPCR methods may involve creating spatially resolved clusters of fluorescent points and drawing a "cutoff" or "threshold" between the clusters to identify whether an individual droplet is a "positive" cluster, containing the target of interest, or a "negative" cluster, not containing the target of interest. Thus, only after "gating" droplets into groups can the exact number of template-positive droplets be measured. However, gating may suffer from inaccuracy due to high levels of subjectivity. Therefore calibrating the location of multiple clusters in a multiplex assay normalizes the locations of the target clusters in an assay, thus mitigating inaccuracies. When multiplexing multiple targets into two channels of a digital PCR reaction, there may be overlap between many of the final states. Accordingly, synthetic or natural targets may be used in a formulation for digital PCR in order to calibrate the location of multiple clusters in a multiplexed approach. FIG. 2 shows experimental data from six-plex respiratory panes. [X] marks hypothetical location of calibrator clusters.

The addition of a template and one or more synthetic (or otherwise generated to be different from the target of interest) primer/probe sets into the mix for the digital PCR reaction (at a known signal ratio to the other targets in the multiplex reaction) ensures that some, but not most, of the droplets generate a "positive" fluorescence. The resulting distinct cluster can be used to normalize the locations of the target clusters in the assay. Additionally or alternatively to addition of template nucleic acid, calibration methods may include spiking known samples into a reaction, using positive controls expected to be present, or, in the case of digital droplet PCR, generating known positive droplets in another reaction and adding them to the reaction vessel before sensing. These clusters could be distinct from the other targets in the assay or in the same locations.

Digital Assays

In some aspects, the present disclosure provides assays for unambiguously detecting the presence or absence of multiple nucleic acid targets in a sample. Nucleic acid target detection may be accomplished by the use of two or more reactions. For example, an assay for measuring a plurality of nucleic acid targets may comprise a first reaction and a second reaction. Both a first and second reaction may, alone, fail to non-degenerately detect the presence or absence of any combination of nucleic acid targets. The results of the first and second reactions may together unambiguously detect the presence or absence of each of the nucleic acid targets.

Any number of nucleic acid targets may be detected using assays of the present disclosure. In some cases, an assay may unambiguously detect at least 3, 4, 5, 6, 7, 8, 9, 10, 11, 12, 13, 14, 15, 20, 30, 40, 50 nucleic acid targets, or more. In some cases, an assay may unambiguously detect at most 50, 40, 30, 20, 15, 14, 13, 12, 11, 10, 9, 8, 7, 6, 5, 4, or 3 nucleic acid targets. An assay may comprise any number of reactions, where the results of the reactions together identify a plurality of nucleic acid targets, in any combination of presence or absence. An assay may comprise 2, 3, 4, 5, 6, 7, 8, 9, 10 reactions, or more. Each reaction may be individually incapable of non-degenerately detecting the presence or absence of any combination of nucleic acid targets. However, the results of each reaction together may unambiguously detect the presence or absence of each of the nucleic acid targets.

Reactions may be performed in the same sample solution volume. For example, a first reaction may generate a fluorescent signal in a first color channel, while a second reaction may generate a fluorescent signal in a second color channel, thereby generating two measurements for comparison. Alternatively, reactions may be performed in different sample solution volumes. For example, a first reaction may be performed in a first sample solution volume and generate a fluorescent signal in a given color channel, and a second reaction may be performed in a second sample solution volume and generate a fluorescent signal in the same color channel or a different color channel, thereby generating two measurements for comparison In some aspects, the present disclosure provides methods for performing a digital assay. A method for performing a digital assay may comprise partitioning a plurality of nucleic acid targets and a plurality of oligonucleotide probes into a plurality of partitions. In some cases, two, three, four, five, or more nucleic acid targets may be partitioned into a plurality of partitions together with two, three, four, five, six, seven, eight, nine, ten, 11, 12, 13, 14, 15, 16, 17, 18, 19, 20 or more oligonucleotide probes. Following partitioning, the nucleic acid targets may be amplified in the partitions, for example, by polymerase chain reaction (PCR). Next, N signals may be generated from the oligonucleotide probes. Each signal of the N signals may correspond to the presence of a unique combination of nucleic acid targets in a partition. Following signal generation, the N signals may be detected in a single optical channel. The signals may be detected using, for example, fluorescence detection in a single-color channel.

A method for performing a digital assay may comprise amplifying nucleic acid targets derived from a sample in a plurality of partitions comprising oligonucleotide probes complementary to one or more regions of nucleic acid targets. Each oligonucleotide probe may be labeled with a fluorophore. The fluorophores may be capable of being detected in a single optical channel. For example, the fluorophores may each comprise similar emission wavelength spectra, such that they can be detected in a single optical channel. Following partitioning, N signals may be detected from the plurality of partitions if one or more of the nucleic acid targets is present. Each of the N signals may correspond to a unique combination of one or more of the nucleic acid targets present in a partition. From the N signals, the presence or absence of each of the nucleic acid targets in the sample may be determined.

A reaction may comprise generating a cumulative signal measurement. Assays of the present disclosure may comprise comparing two or more cumulative signal measurements to unambiguously detect any combination of nucleic acid targets in a sample. A cumulative signal measurement may comprise one or more signals generated from one or more probes provided to a sample solution. A cumulative signal measurement may be a signal intensity level which corresponds to the sum of signals generated from multiple oligonucleotide probes. For example, two probes may each bind to a nucleic acid molecule, where each probe generates a signal of a given wavelength at 1× intensity. Measurement of these signals would generate a cumulative signal measurement corresponding to the sum of both signal intensities, namely a 2× signal intensity.

A reaction may comprise an ambiguity. An ambiguity may be a signal that fails to unambiguously identify a single combination of nucleic acid targets in a sample. For example, a reaction may generate a signal at 2× intensity level. Based on the encoding of the reaction (e.g., the concentration of hybridization probes present in the reaction), a 2× intensity level may correspond to more than one combination of nucleic acid targets, thereby comprising an ambiguity. An ambiguity may be resolved by performing one or more additional reactions, thereby resolving the ambiguity. For example, a second reaction may generate a 3× signal intensity level, where the presence of both a 2× signal intensity level from a first reaction and a 3× signal intensity level from a second reaction uniquely identifies a given combination of nucleic acid targets from a sample.

An assay may comprise selecting two or more reactions from a selection of reactions, depending on the information necessary to resolve an ambiguity. For example, a first reaction may comprise an ambiguity at a first signal level and a second signal level. Results corresponding to the first signal level may identify a first additional reaction as necessary to resolve the ambiguity, while results corresponding to the second signal level may identify a second additional reaction as necessary to resolve the ambiguity.

Amplification

In some aspects, the disclosed methods comprise nucleic acid amplification. Amplification may be performed before or after partitioning. In some cases, amplification of nucleic acid targets is performed in a plurality of partitions. For example, nucleic acid targets may be partitioned into a plurality of droplets, and amplification performed within each droplet, thereby generating a signal if at least one nucleic acid target is present in a droplet.

Amplification conditions may be modified such that the signals generated in a digital assay uniquely identify each combination of targets. Amplification conditions may comprise thermal cycling conditions, including temperature and length in time of each thermal cycle. The use of particular amplification conditions may serve to modify the signal intensity of each signal, thereby enabling each signal to correspond to a unique combination of nucleic acid targets in a partition.

Partitioning

Methods of the present disclosure may comprise partitioning a sample or mixture into a plurality of partitions. A sample of mixture may comprise nucleic acids, oligonucleotide probes, and/or additional reagents into a plurality of partitions. A partition may be a droplet (e.g., a droplet in an emulsion). A partition may be a microdroplet. A partition may be a well. A partition may be a microwell. Partitioning may be performed using a microfluidic device. In some cases, partitioning is performed using a droplet generator. Partitioning may comprise dividing a sample or mixture into water-in-oil droplets. A droplet may comprise one or more nucleic acids. A droplet may comprise a single nucleic acid. A droplet may comprise two or more nucleic acids. A droplet may comprise no nucleic acids. Each droplet of a plurality of droplets may generate a signal. A plurality of signals may comprise the signal(s) generated from each of a plurality of droplets comprising a subset of a sample.

Thermal Cycling

Methods of the present disclosure may comprise thermal cycling. Thermal cycling may comprise one or more thermal cycles. Thermally cycling may be performed under reaction conditions appropriate to amplify a template nucleic acid with PCR. Amplification of a template nucleic acid may require binding or annealing of oligonucleotide primer(s) to the template nucleic acid. Appropriate reaction conditions may include appropriate temperature conditions, appropriate buffer conditions, and the presence of appropriate reagents. Appropriate temperature conditions may, in some cases, be such that each thermal cycle is performed at a desired annealing temperature. A desired annealing temperature may be sufficient for annealing of an oligonucleotide probe(s) to a nucleic acid target. Appropriate buffer conditions may, in some cases, be such that the appropriate salts are present in a buffer used during thermal cycling. Appropriate salts may include magnesium salts, potassium salts, ammonium salts. Appropriate buffer conditions may be such that the appropriate salts are present in appropriate concentrations. Appropriate reagents for amplification of each member of a plurality of nucleic acid targets with PCR may include deoxytriphosphates (dNTPs). dNTPs may comprise natural or non-natural dNTPs including, for example, dATP, dCTP, dGTP, dTTP, dUTP, and variants thereof.

Nucleic Acid Targets

A nucleic acid target of the present disclosure may be derived from a biological sample. A biological sample may be a sample derived from a subject. A biological sample may comprise any number of macromolecules, for example, cellular macromolecules. A biological sample may be derived from another sample. A biological sample may be a tissue sample, such as a biopsy, core biopsy, needle aspirate, or fine needle aspirate. A biological sample may be a fluid sample, such as a blood sample, urine sample, or saliva sample. A biological sample may be a skin sample. A biological sample may be a cheek swab. A biological sample may be a plasma or serum sample. A biological sample may comprise one or more cells. A biological sample may be a cell-free sample. A cell-free sample may comprise extracellular polynucleotides. Extracellular polynucleotides may be isolated from a bodily sample that may be selected from the group consisting of blood, plasma, serum, urine, saliva, mucosal excretions, sputum, stool and tears.

A nucleic acid target may be derived from one or more cells. A cell may be a tumor cell. A cell may be a cell suspected of comprising a viral pathogen. In some cases, a nucleic acid target is derived from a cell-free sample (e.g., serum, plasma). A nucleic acid target may be cell-free nucleic acid. Cell-free nucleic acid may be, for example, cell-free tumor DNA, cell-free fetal DNA, cell-free RNA, etc. A nucleic acid target may comprise deoxyribonucleic acid (DNA). DNA may be any kind of DNA, including genomic DNA. A nucleic acid target may be viral DNA. A nucleic acid target may comprise ribonucleic acid (RNA). RNA may be any kind of RNA, including messenger RNA, transfer RNA, ribosomal RNA, and microRNA. RNA may be viral RNA. Nucleic acid targets may comprise one or more members. A member may be any region of a nucleic acid target. A member may be of any length. A member may be, for example, up to 1, 2, 3, 4, 5, 10, 20, 50, 100, 500, 1000, 5000, 10000, 50000, or 100000 nucleotides, or more. In some instances, a member may be a gene. A nucleic acid target may comprise a gene whose detection may be useful in diagnosing one or more diseases. A gene may be a viral gene or bacterial gene whose detection may be useful in identifying the presence or absence of a pathogen in a subject. In some cases, the methods of the present disclosure are useful in detecting the presence or absence or one or more infectious agents (e.g., viruses) in a subject.

In some cases, a nucleic acid target is a chromosome. One or more nucleic acid molecules analyzed by methods of the present disclosure may correspond to a chromosome. For example, nucleic acid molecules may be fragments of a chromosome. In another example, nucleic acid molecules may be amplification products of a chromosome. Nucleic acid molecules corresponding to a chromosome may be obtained from one or more cells. Nucleic acid molecules corresponding to a chromosome may be obtained from a cell-free sample (e.g., serum, plasma, blood, etc.).

Sample Processing

A sample may be processed concurrently with, prior to, or subsequent to the methods of the present disclosure. A sample may be processed to purify or enrich for nucleic acids (e.g., to purify nucleic acids from a plasma sample). A sample comprising nucleic acids may be processed to purity or enrich for nucleic acid of interest. A sample comprising nucleic acids may be processed to enrich for fetal nucleic acid. A sample may be enriched for nucleic acid of interest (e.g., fetal nucleic acid) by various methods including, for example, sequence-specific enrichment (e.g., via use of capture sequences), epigenetic-specific enrichment (e.g., via use of methylation-specific capture moieties, such as antibodies). Enrichment may comprise isolation of nucleic acid of interest and/or depletion of nucleic acid that is not of interest. In some cases, a sample is not processed to purify or enrich for nucleic acid of interest prior to performing methods of the present disclosure (e.g., amplification of nucleic acids from a sample). For example, a sample may not be processed to enrich for fetal nucleic acid prior to mixing a sample with oligonucleotide primers and oligonucleotide probes, as described elsewhere herein.

Nucleic Acid Enzymes

Mixtures and compositions of the present disclosure may comprise one or more nucleic acid enzymes. A nucleic acid enzyme may have exonuclease activity. A nucleic acid enzyme may have endonuclease activity. A nucleic acid enzyme may have RNase activity. A nucleic acid enzyme may be capable of degrading a nucleic acid comprising one or more ribonucleotide bases. A nucleic acid enzyme may be, for example, RNase H or RNase III. An RNase III may be, for example, Dicer. A nucleic acid may be an endonuclease I such as, for example, a T7 endonuclease I. A nucleic acid enzyme may be capable of degrading a nucleic acid comprising a non-natural nucleotide. A nucleic acid enzyme may be an endonuclease V such as, for example, an E. coli endonuclease V. A nucleic acid enzyme may be a polymerase (e.g., a DNA polymerase). A polymerase may be Taq polymerase or a variant thereof. A nucleic acid enzyme may be capable, under appropriate conditions, of degrading an oligonucleotide probe. A nucleic acid enzyme may be capable, under appropriate conditions, of releasing a quencher from an oligonucleotide probe.

Reactions

A reaction may comprise contacting nucleic acid targets with one or more oligonucleotide probes. A reaction may comprise contacting a sample solution volume (e.g., a droplet, well, tube, etc.) with a plurality of oligonucleotide probes, each corresponding to one of a plurality of nucleic acid targets, to generate a plurality of signals generated from the plurality of oligonucleotide probes. A reaction may comprise polymerase chain reaction (PCR). A reaction may be a digital PCR reaction.

In some cases, one or more signals from a plurality of signals fail to non-degenerately identify the presence or absence of any combination of a plurality of nucleic acid molecules (e.g., a signal corresponds to two or more combinations of nucleic acid molecules in a sample volume). As disclosed herein, two or more signals may be compared, thereby non-degenerately indicating the presence or absence of a plurality of nucleic acid targets, in any combination.

In some cases, one or more synthetic (or otherwise generated to be different from the target of interest) primer/probe sets may be used to calibrate the location of multiple signals in a reaction (e.g., a digital PCR reaction). A reaction may include a known amount of template. A ratio of a known template to the other targets in a reaction may be used to normalize the locations of target clusters in an assay (see, e.g., FIG. 2).

Oligonucleotide Primers

An oligonucleotide primer (or "amplification oligomer") of the present disclosure may be a deoxyribonucleic acid. An oligonucleotide primer may be a ribonucleic acid. An oligonucleotide primer may comprise one or more non-natural nucleotides. A non-natural nucleotide may be, for example, deoxyinosine.

An oligonucleotide primer may be a forward primer. An oligonucleotide primer may be a reverse primer. An oligonucleotide primer may be between about 5 and about 50 nucleotides in length. An oligonucleotide primer may be at least 5, 10, 11, 12, 13, 14, 15, 16, 17, 18, 19, 20, 25, 30, 35, 40, 45, or 50 base pairs in length, or more. An oligonucleotide primer may be at most 50, 45, 40, 35, 30, 25, 20, 19, 18, 17, 16, 15, 14, 13, 12, 11, 10, or 5 nucleotides in length. An oligonucleotide primer may be about 5, 10, 11, 12, 13, 14, 15, 16, 17, 18, 19, 20, 25, 30, 35, 40, 45, or 50 base pairs in length.

A set of oligonucleotide primers may comprise paired oligonucleotide primers. Paired oligonucleotide primers may comprise a forward oligonucleotide primer and a reverse oligonucleotide primer. A forward oligonucleotide primer may be configured to hybridize to a first region (e.g., a 3' end) of a nucleic acid sequence, and a reverse oligonucleotide primer may be configured to hybridize to a second region (e.g., a 5' end) of the nucleic acid sequence, thereby being configured to amplify the nucleic acid sequence under conditions sufficient for nucleic acid amplification. Different sets of oligonucleotide primers may be configured to amplify different nucleic acid target sequences.

A mixture may comprise a plurality of forward oligonucleotide primers. A plurality of forward oligonucleotide primers may be a deoxyribonucleic acid. Alternatively, a plurality of forward oligonucleotide primers may be a ribonucleic acid. A plurality of forward oligonucleotide primers may be between about 5 and about 50 nucleotides in length. A plurality of forward oligonucleotide primer may be at least 5, 10, 11, 12, 13, 14, 15, 16, 17, 18, 19, 20, 25, 30, 35, 40, 45, or 50 base pairs in length, or more. A plurality of forward oligonucleotide primer may be at most 50, 45, 40, 35, 30, 25, 20, 19, 18, 17, 16, 15, 14, 13, 12, 11, 10, or 5 nucleotides in length.

A mixture may comprise a plurality of reverse oligonucleotide primers. A plurality of reverse oligonucleotide primers may be a deoxyribonucleic acid. Alternatively, a plurality of reverse oligonucleotide primers may be a ribonucleic acid. A plurality of reverse oligonucleotide primers may be between about 5 and about 50 nucleotides in length. A plurality of reverse oligonucleotide primer may be at least 5, 10, 11, 12, 13, 14, 15, 16, 17, 18, 19, 20, 25, 30, 35, 40, 45, or 50 base pairs in length, or more. A plurality of reverse oligonucleotide primer may be at most 50, 45, 40, 35, 30, 25, 20, 19, 18, 17, 16, 15, 14, 13, 12, 11, 10, or 5 nucleotides in length.

In some aspects, a mixture may include one or more synthetic (or otherwise generated to be different from the target of interest) primers for digital PCR reactions. The one or more synthetic primers may be used in combination with a template to calibrate the location of multiple clusters in a reaction (see, e.g., FIG. 2).

In some aspects, a mixture may be subjected to conditions sufficient to anneal an oligonucleotide primer to a nucleic acid molecule. In some aspects, a mixture may be subjected to conditions sufficient to anneal a plurality of oligonucleotide primers to a nucleic acid molecule. In some aspects, a mixture may be subjected to conditions sufficient to anneal a plurality of oligonucleotide primers to a plurality of nucleic acid targets. The mixture may be subjected to conditions which are sufficient to denature nucleic acid molecules. Subjecting a mixture to conditions sufficient to anneal an oligonucleotide primer to a nucleic acid target may comprise thermally cycling the mixture under reaction conditions appropriate to amplify the nucleic acid target(s) with, for example, polymerase chain reaction (PCR).

Conditions may be such that an oligonucleotide primer pair (e.g., forward oligonucleotide primer and reverse oligonucleotide primer) are degraded by a nucleic acid enzyme. An oligonucleotide primer pair may be degraded by the exonuclease activity of a nucleic acid enzyme. An oligonucleotide primer pair may be degraded by the RNase activity of a nucleic acid enzyme. Degradation of the oligonucleotide primer pair may result in release of the oligonucleotide primer. Once released, the oligonucleotide primer pair may bind or anneal to a template nucleic acid.

Oligonucleotide Probes

Samples, mixtures, kits, and compositions of the present disclosure may comprise an oligonucleotide probe, also referenced herein as a "detection probe" or "probe". An oligonucleotide probe may be a nucleic acid (e.g., DNA, RNA, etc.). An oligonucleotide probe may comprise a region complementary to a region of a nucleic acid target. The concentration of an oligonucleotide probe may be such that it is in excess relative to other components in a sample.

An oligonucleotide probe may comprise a non-target-hybridizing sequence. A non-target-hybridizing sequence may be a sequence which is not complementary to any region of a nucleic acid target sequence. An oligonucleotide probe comprising a non-target-hybridizing sequence may be a hairpin detection probe. An oligonucleotide probe comprising a non-target-hybridizing sequence may be a molecular beacon probe. Examples of molecular beacon probes are provided in, for example, U.S. Pat. No. 7,671,184, incorporated herein by reference in its entirety. An oligonucleotide probe comprising a non-target-hybridizing sequence may be a molecular torch. Examples of molecular torches are provided in, for example, U.S. Pat. No. 6,534,274, incorporated herein by reference in its entirety.

A sample may comprise more than one oligonucleotide probe. Multiple oligonucleotide probes may be the same, or may be different. An oligonucleotide probe may be at least 5, at least 10, at least 15, at least 20, or at least 30 nucleotides in length, or more. An oligonucleotide probe may be at most 30, at most 20, at most 15, at most 10 or at most 5 nucleotides in length. In some examples, a mixture comprises a first oligonucleotide probe and one or more additional oligonucleotide probes. An oligonucleotide probe may be a nucleic acid (e.g., DNA, RNA, etc.). An oligonucleotide probe may be at least 2, 3, 4, 5, 6, 7, 8, 9, 10, 20, 30, 40, or 50 nucleotides in length, or more. An oligonucleotide probe may be at most 50, 40, 30, 20, 10, 9, 8, 7, 6, 5, 4, 3, or 2 nucleotides in length.

In some cases, 2, 3, 4, 5, 6, 7, 8, 9, 10, 11, 12, 13, 14, 15, 20, or more different oligonucleotide probes are partitioned into a plurality of partitions. Each oligonucleotide probe may correspond to (e.g., capable of binding to) a given region of a nucleic acid target (e.g., a chromosome) in a sample. In one example, a first oligonucleotide probe is specific for a first region of a first nucleic acid target, a second oligonucleotide probe is specific for a second region of the first nucleic acid target, and a third oligonucleotide probe is specific for a third region of the first nucleic acid target. Each oligonucleotide probe may comprise a signal tag with about equal emission wavelengths. In some cases, each oligonucleotide probe comprises an identical fluorophore. In some cases, each oligonucleotide probe comprises a different fluorophore, where each fluorophore is capable of being detected in a single optical channel.

In some aspects, a mixture may include one or more synthetic (or otherwise generated to be different from the target of interest) probes for digital PCR reactions. The one or more synthetic probes may have a known fluorescence ratio to the other targets in the reaction and used to calibrate the location of multiple clusters in a reaction. The one or more synthetic probes may be used to normalize the locations of the target clusters in the assay by ensuring that some, but not most, of the droplets generate a "positive" fluorescence in a distinct cluster (see, e.g., FIG. 2).

A probe may correspond to a region of a nucleic acid target. For example, a probe may have complementarity and/or homology to a region of a nucleic acid target. A probe may comprise a region which is complementary or homologous to a region of a nucleic acid target. A probe corresponding to a region of a nucleic acid target may be capable of binding to the region of the nucleic acid target under appropriate conditions (e.g., temperature conditions, buffer conditions. etc). For example, a probe may be capable of binding to a region of a nucleic acid target under conditions appropriate for polymerase chain reaction. A probe may correspond to an oligonucleotide which corresponds to a nucleic acid target. For example, an oligonucleotide may be a primer with a region complementary to a nucleic acid target and a region complementary to a probe.

A probe may be a nucleic acid complementary to a region of a given nucleic acid target. Each probe used in the methods and assays of the presence disclosure may comprise at least one fluorophore. A fluorophore may be selected from any number of fluorophores. A fluorophore may be selected from three, four, five, six, seven, eight, nine, or ten fluorophores, or more. One or more oligonucleotide probes used in a single reaction may comprise the same fluorophore. In some cases, all oligonucleotide probes used in a single reaction comprise the same fluorophore. Each probe may, when excited and contacted with its corresponding nucleic acid target, generate a signal. A signal may be a fluorescent signal. A plurality of signals may be generated from one or more probes.

An oligonucleotide probe may have less than 50%, 40%, 30%, 20%, 10%, 5%, or 1% complementarity to any member of a plurality of nucleic acid targets. An oligonucleotide probe may have no complementarity to any member of the plurality of nucleic acid targets.

An oligonucleotide probe may comprise a detectable label. A detectable label may be a chemiluminescent label. A detectable label may comprise a chemiluminescent label. A detectable label may comprise a fluorescent label. A detectable label may comprise a fluorophore. A fluorophore may be, for example, FAM, TET, HEX, JOE, Cy3, or Cy5. A fluorophore may be FAM. A fluorophore may be HEX. An oligonucleotide probe may further comprise one or more quenchers. A quencher may inhibit signal generation from a fluorophore. A quencher may be, for example, TAMRA, BHQ-1, BHQ-2, or Dabcy. A quencher may be BHQ-1. A quencher may be BHQ-2.

Signal Generation

Thermal cycling may be performed such that one or more oligonucleotide probes are degraded by a nucleic acid enzyme. An oligonucleotide probe may be degraded by the exonuclease activity of a nucleic acid enzyme. An oligonucleotide probe may generate a signal upon degradation. In some cases, an oligonucleotide probe may generate a signal only if at least one member of a plurality of nucleic acid targets is present in a mixture.

A reaction may generate one or more signals. A reaction may generate a cumulative intensity signal comprising a sum of multiple signals. A signal may be a chemiluminescent signal. A signal may be a fluorescent signal. A signal may be generated by an oligonucleotide probe. For example, excitation of a hybridization probe comprising a luminescent signal tag may generate a signal. A signal may be generated by a fluorophore. A fluorophore may generate a signal upon release from a hybridization probe. A reaction may comprise excitation of a fluorophore. A reaction may comprise signal detection. A reaction may comprise detecting emission from a fluorophore.

A signal may be a fluorescent signal. A signal may correspond to a fluorescence intensity level. Each signal measured in the methods of the present disclosure may have a distinct fluorescence intensity value, thereby corresponding to the presence of a unique combination of nucleic acid targets in a partition. A signal may be generated by one or more oligonucleotide probes. The number of signals generated in a digital assay may correspond to the number of oligonucleotide probes that are partitioned, the number of nucleic acid targets that are partitioned, and, in some cases, the partitioning conditions. For example, where three nucleic acid targets and three oligonucleotide probes are partitioned such that each partition may comprise one, two, or all three nucleic acid targets, seven signals may be generated, where each signal corresponds to the presence of a unique combination of the three nucleic acid targets in the partition. N may be a number of signals detected in a single optical channel in an assay of the present disclosure. N may be at least 2, 3, 4, 5, 6, 7, 8, 9, 10, 11, 12, 13, 14, 15, 20, 25, 30, 40, 50 or more. N may be at most 50, 40, 30, 24, 20, 15, 14, 13, 12, 11, 10, 9, 8, 7, 6, 5, 4, 3, or 2. N may be 2, 3, 4, 5, 6, 7, 8, 9, 10, 11, 12, 13, 14, 15, 20, 25, 30, 40, or 50.

As will be recognized and is described elsewhere herein, sets of signals may be generated in multiple different optical channels, where each set of signals is detected in a single optical channel, thereby significantly increasing the number of nucleic acid targets that can be measured in a single reaction (e.g., digital PCR reaction). In some cases, two sets of signals are detected in a single reaction. Each set of signals detected in a reaction may comprise the same number of signals, or different numbers of signals.

In some cases, a signal may be generated simultaneous with hybridization of an oligonucleotide probe to a region of a nucleic acid. For example, an oligonucleotide probe (e.g., a molecular beacon probe or molecular torch) may generate a signal (e.g., a fluorescent signal) following hybridization to a nucleic acid. In some cases, a signal may be generated subsequent to hybridization of an oligonucleotide probe to a region of a nucleic acid, following degradation of the oligonucleotide probe by a nucleic acid enzyme.

In cases where an oligonucleotide probe comprises a signal tag, the oligonucleotide probe may be degraded when bound to a region of an oligonucleotide primer, thereby generating a signal. For example, an oligonucleotide probe (e.g., a TaqMan® probe) may generate a signal following hybridization of the oligonucleotide probe to a nucleic acid and subsequent degradation by a polymerase (e.g., during amplification, such as PCR amplification). An oligonucleotide probe may be degraded by the exonuclease activity of a nucleic acid enzyme.

An oligonucleotide probe may comprise a quencher and a fluorophore, such that the quencher is released upon degradation of an oligonucleotide probe, thereby generating a fluorescent signal. Thermal cycling may be used to generate one or more signals. Thermal cycling may generate at least 1, 2, 3, 4, 5, 6, 7, 8, 9, 10 signals, or more. Thermal cycling may generate at most 10, 9, 8, 7, 6, 5, 4, 3, 2, or 1 signal. Multiple signals may be of the same type or of different types. Signals of different types may be fluorescent signals with different fluorescent wavelengths. Signals of different types may be generated by detectable labels comprising different fluorophores. Signals of the same type may be of different intensities (e.g., different intensities of the same fluorescent wavelength). Signals of the same type may be signals detectable in the same color channel. Signals of the same type may be generated by detectable labels comprising the same fluorophore. Detectable labels comprising the same fluorophore may generate different signals by nature of being at different concentrations, thereby generating different intensities of the same signal type.

The methods presented in this disclosure may be used with any quantifiable signal. In some cases, this disclosure provides methods to quantify targets using a single component of a signal (e.g., intensity). For example, an analysis may rely on a multiplicity of signal intensity without consideration of color. Although fluorescent probes have been used to illustrate this principle, the disclosed methods are equally applicable to any other method providing a quantifiable signal, including an electrochemical signal and a chemiluminescent signal.

The methods presented in this disclosure may also utilize the measurement of a signal in at least two dimensions, also referred to as the measurement of at least two components of a signal (e.g., color and intensity). In some cases, a quantifiable signal comprises a waveform that has both a frequency (wavelength) and an amplitude (intensity). A signal may be an electromagnetic signal. An electromagnetic signal may be a sound, a radio signal, a microwave signal, an infrared signal, a visible light signal, an ultraviolet light signal, an x-ray signal, or a gamma-ray signal. In some cases, an electromagnetic signal may be a fluorescent signal, for example a fluorescence emission spectrum that may be characterized in terms of wavelength and intensity.

In certain portions of this disclosure, the signal is described and exemplified in terms of a fluorescent signal. This is not meant to be limiting, and one of ordinary skill in the art will readily recognize that the principles applicable to the measurement of a fluorescent signal are also applicable to other signals. For example, like fluorescent signals, any of the electromagnetic signals described above may also be characterized in terms of a wavelength and an intensity. The wavelength of a fluorescent signal may also be described in terms of color. The color may be determined based on measuring intensity at a particular wavelength or range of wavelengths, for example by determining a distribution of fluorescent intensity at different wavelengths and/or by utilizing a band pass filter to determine the fluorescence intensity within a particular range of wavelengths. Intensity may be measured with a photodetector. A range of wavelengths may be referred to as a "channel," "color channel," or "optical channel."

The presence or absence of one or more signals may be detected. One signal may be detected, or multiple signals may be detected. Multiple signals may be detected simultaneously. Alternatively, multiple signals may be detected sequentially. The presence of a signal may be correlated to the presence of a nucleic acid target. The presence of least 1, 2, 3, 4, 5, 6, 7, 8, 9, 10, or more signals may be correlated with the presence of at least one of at least 1, 2, 3, 4, 5, 6, 7, 8, 9, 10, or more nucleic acid targets. The absence of a signal may be correlated with the absence of corresponding nucleic acid targets. The absence of least 1, 2, 3, 4, 5, 6, 7, 8, 9, 10, or more signals may be correlated with the absence of each of at least 1, 2, 3, 4, 5, 6, 7, 8, 9, 10, or more nucleic acid target molecules.

Kits

The present disclosure also provides kits for multiplex analysis. Kits may comprise one or more oligonucleotide probes. Oligonucleotide probes may be lyophilized. Different oligonucleotide probes may be present at different concentrations in a kit. Oligonucleotide probes may comprise a fluorophore and/or one or more quenchers.

Kits may comprise one or more sets of oligonucleotide primers (or "amplification oligomers") as described herein. A set of oligonucleotide primers may comprise paired oligonucleotide primers. Paired oligonucleotide primers may comprise a forward oligonucleotide primer and a reverse oligonucleotide primer. A set of oligonucleotide primers may be configured to amplify a nucleic acid sequence corresponding to particular targets. For example, a forward oligonucleotide primer may be configured to hybridize to a first region (e.g., a 3' end) of a nucleic acid sequence, and a reverse oligonucleotide primer may be configured to hybridize to a second region (e.g., a 5' end) of the nucleic acid sequence, thereby being configured to amplify the nucleic acid sequence. Different sets of oligonucleotide primers may be configured to amplify nucleic acid sequences. In one example, a first set of oligonucleotide primers may be configured to amplify a first nucleic acid sequence, and a second set of oligonucleotide primers may be configured to amplify a second nucleic acid sequence. Oligonucleotide primers configured to amplify nucleic acid molecules may be used in performing the disclosed methods. In some cases, all of the oligonucleotide primers in a kit are lyophilized.

Kits may comprise one or more nucleic acid enzymes. A nucleic acid enzyme may be a nucleic acid polymerase. A nucleic acid polymerase may be a deoxyribonucleic acid polymerase (DNase). A DNase may be a Taq polymerase or variant thereof. A nucleic acid enzyme may be a ribonucleic acid polymerase (RNase). An RNase may be an RNase III. An RNase III may be Dicer. The nucleic acid enzyme may be an endonuclease. An endonuclease may be an endonuclease I. An endonuclease I may be a T7 endonuclease I. Kits may comprise instructions for using any of the foregoing in the methods described herein.

Additionally, kits may include one or more synthetic (or otherwise generated to be different from the target of interest) primer/probe sets for digital PCR reactions. The one or more synthetic primer/probe sets may be used to calibrate the location of multiple clusters in a multiplex. The kit may also include a known amount of template.

Kits provided herein may be useful in, for example, calculating at least first and second sums, each being a sum of multiple target signals corresponding with a first and second chromosome.

EXAMPLES

Figure 3A:
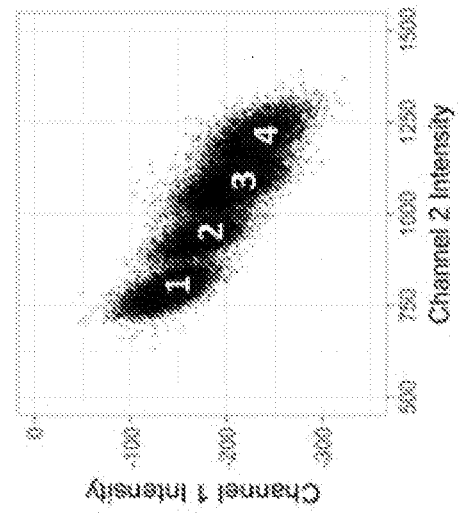
FIGS. 3A-C illustrate a formulation for digital PCR creating overlapping clusters.
Figure 3B:
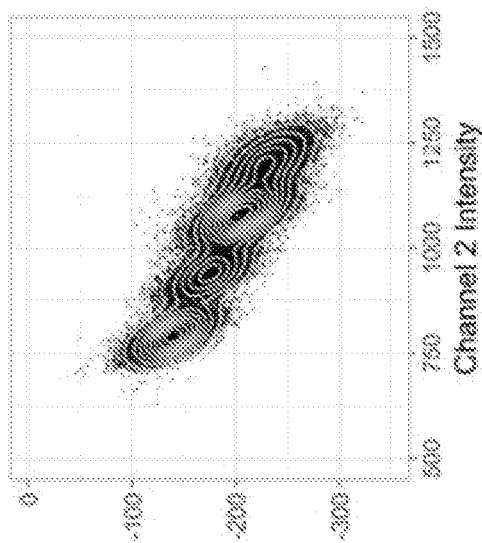
Figure 3C:
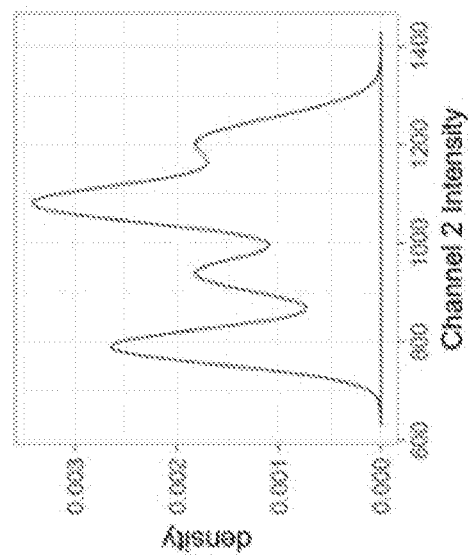

Example 1—Estimation of Target Quantities in a Digital PCR Assay with Overlapping Clusters A digital PCR assay was run consisting of two targets labeled with ATT0532 dye with different probe concentrations, resulting in a discrete cluster depending on whether a partition contained: (1) no template; (2) FluAPan marker; (3) FluAH3 marker; or (4) both Pan FluA and FluAH3 targets. The assay was tested on a Bio-Rad CX100, and an exemplary well's data is shown in FIG. 3A. While each cluster is not spatially resolved, a contour plot of the droplet density field indicated distinct cluster presence is identifiable, as shown in FIG. 3B. A density plot of the x-axis, shown in FIG. 3C, shows four distinct clusters, in which individual droplets from each cluster could not be identified, nor could the number of droplets for each cluster be identified with a standard "cutoff" method.

Figure 4A:
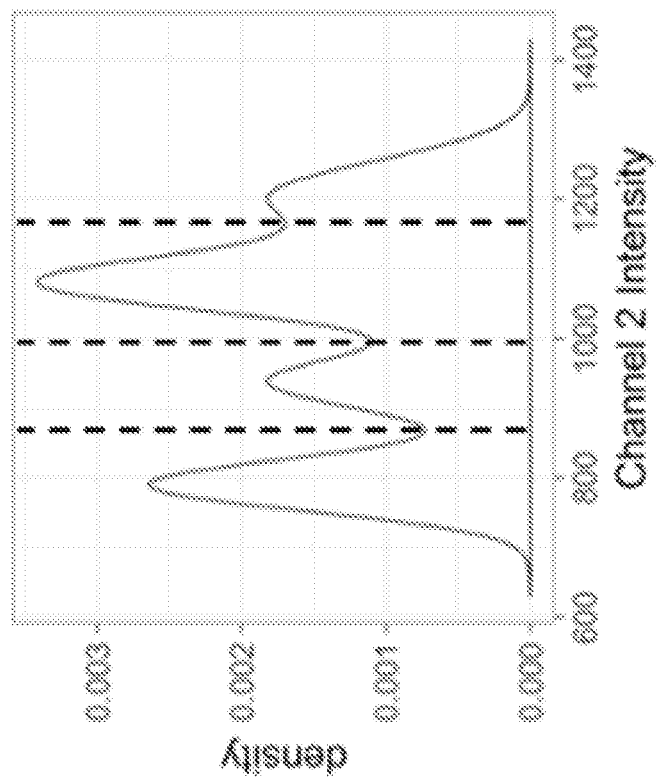
FIG. 4A illustrates Midpoint threshold modeling.
Figure 4B:
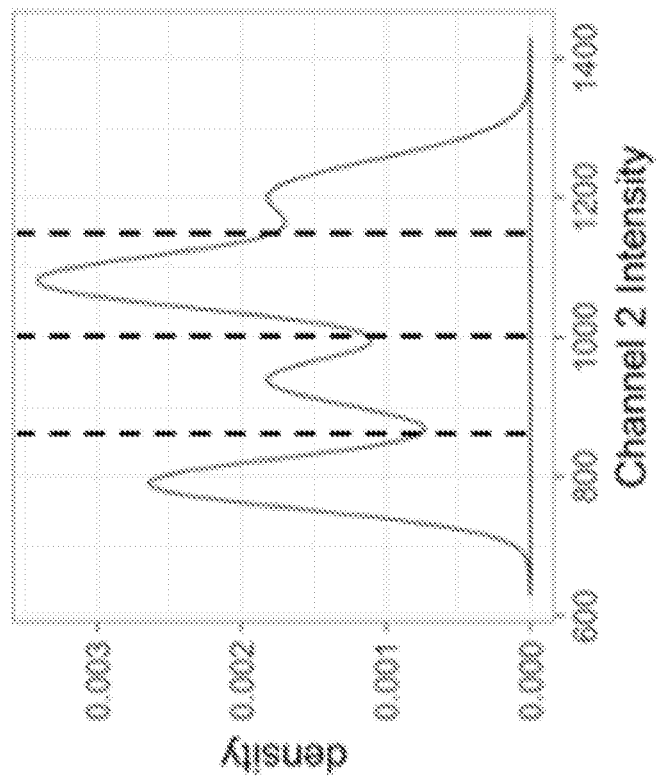
FIG. 4B illustrates Relative minimum thresholding.

Various methods may be used for choosing thresholds either at the midpoint or minimum between peaks in multimodal distributions. FIG. 4A shows use of the midpoint between each cluster peak as a threshold and assigning all droplets in a given region to that cluster ("Midpoint threshold modeling"). FIG. 4B shows use of the minimum between peaks as the threshold and assigning droplets in a given region to that cluster ("Relative minimum thresholding").

Figure 5:
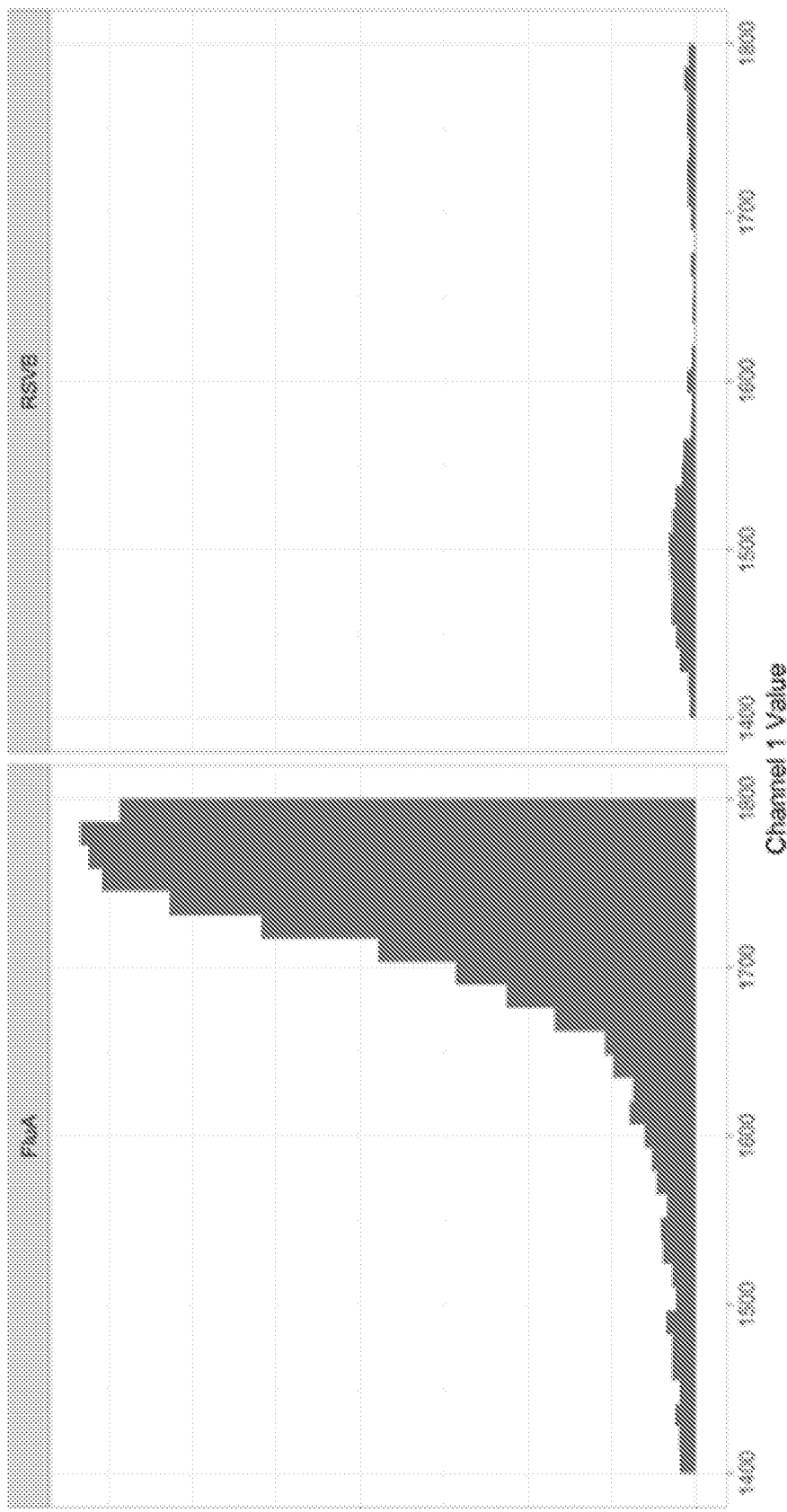
FIG. 5 shows an example histogram decomposition of a FluA target and an RSVB target.

Since many simple distributions are unimodal, one way to model a multimodal distribution would be to assume that it is generated by multiple unimodal distributions. While each individual droplet cannot be assigned to the parent cluster, the relative numbers and total number of droplets can be assigned by assuming a model for the underlying distribution for each cluster and decomposing the histogram into individual components (see FIG. 5). FIG. 5 shows an example histogram decomposition of a FluA target centered at 1750 fluorescent intensity units at 10,000 copy input and an RSVB target centered at 1500 fluorescence units at 1000 copy input.

The most commonly used distribution in modeling real-world unimodal data is the Gaussian distribution. Furthermore, Gaussian Mixture Models ("partial probability summation") maintain many of the theoretical and computational benefits of Gaussian models, making them practical for efficiently modeling very large datasets. Thus, modeling multimodal data as a mixture of many unimodal Gaussian distributions was used here.

The parameters for a Gaussian were fit to each cluster and a list of partial probabilities was assigned to each droplet in the distribution based on the ratio of the height of each Gaussian in the model. Estimation of copies per droplet and ratios was done by summing the partial probabilities for each droplet across all droplets.

Formula 1: Equation for a Gaussian Mixture Model Distribution $$ae^{(x-b)^2/2c^2}$$

To assess the advantages of quantifying with different approaches, 5 replicate wells were run in a digital PCR assay and the coefficient of variation of either estimated Copies per Droplet (CPD) or ratio of FluAH3 marker/FluAPan was assessed between the wells.

Figure 6:
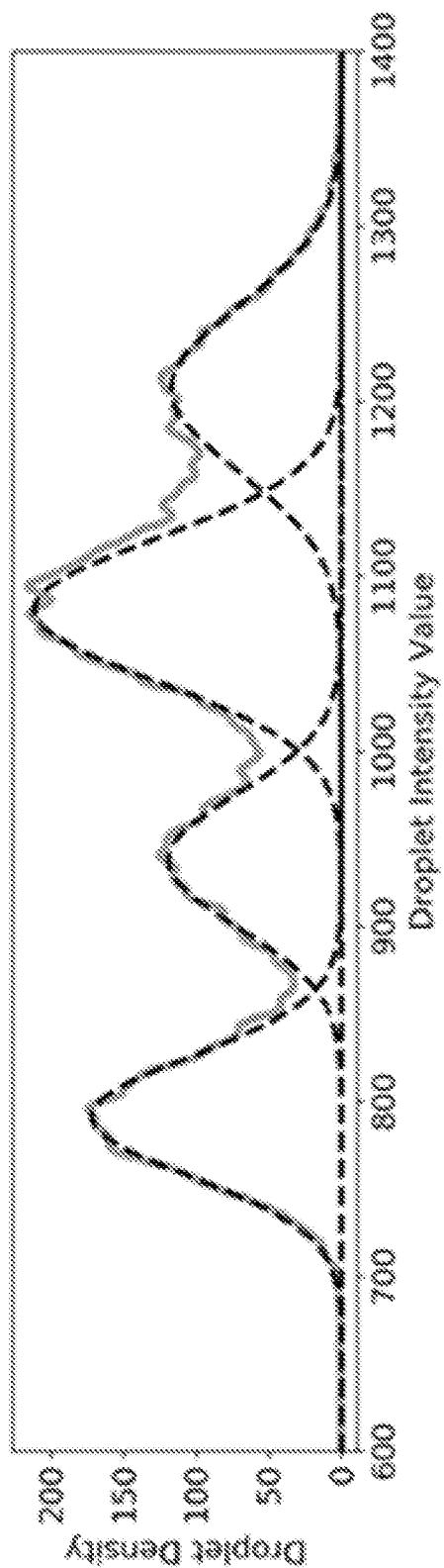
FIG. 6 shows a Gaussian fit to four peaks from data and example droplet intensities and partial probabilities assigned.

FIG. 6 shows representative Gaussian fit for the data, and Table 1 shows example droplet intensities and partial probabilities assigned.

TABLE 1

| Droplet | Intensity | p(1) | p(2) | p(3) | p(4) |
|---------|-----------|------|------|------|------|
| 1 | 750 | 1 | 0 | 0 | 0 |
| 2 | 930 | 0 | 1 | 0 | 0 |
| 3 | 1000 | 0 | 0.5 | 0.5 | 0 |
| Total | NA | 1 | 1.5 | 0.5 | 0 |

The overall probability of FluAH3 being in a given droplet was estimated as 0.5/3=⅙, which was then corrected based on an expected Poisson distribution of occupancy using Poisson sampling statistics ($\lambda = -\ln(1-k/n)$ where k is the number of positive droplets, n the total number of droplets and X the mean copies per droplet). The results were a computed ratio of 3.81 (Where FluAH3: $-\ln(1-0.5/3.0)=0.182$ copies per droplet & FluAPan: $=-\ln(1-1.5/3.0)=0.693$ copies per droplet).

Gaussian Mixture Model was further be used for direct computation of copies per droplet (CPD) and Ratios from the probability distributions ("Direct Probability Distribution").

Formula 2: Area Under a Gaussian, where N is the Area for a Particular Identified Cluster.

$$A_n = \sqrt{2} a_n |c_n| \sqrt{\pi}$$

Formula 3: Computing the Estimated Copies Per Droplet for One Target in a Mixture of N Total Clusters Including No Template Clusters.

$$\text{Copies per droplet } H3 = -\ln\left(1 - \frac{A_3 + A_4}{\sum_{n=1}^{N} A_n}\right) = -\ln\left(1 - \frac{a_3|c_3| + a_4|c_4|}{\sum_{n=1}^{N} a_n|c_n|}\right)$$

Formula 4: Directly Computing the Ratio of Two Targets by Summing the Areas Under the Probability Distribution of Each Cluster that Contains the Target and Correcting for Poisson Loading of the Partitions.

$$\text{Ratio } H3{:}FluAPan = \frac{-\ln\left(1 - \frac{a_3|c_3| + a_4|c_4|}{\sum_{n=1}^{N} a_n|c_n|}\right)}{-\ln\left(1 - \frac{a_2|c_2| + a_4|c_4|}{\sum_{n=1}^{N} a_n|c_n|}\right)}$$

In the case of quantification of number of copies per droplet of template or directly computing the ratios between targets, these new methods required fewer steps and show improved repeatability over current methods. Peak minimum thresholding, midpoint thresholding, partial probability summation and direct probability distribution between FluAPan (Table 2) and FluAH3 (Table 3) were compared. The calculated ratios between concentrations of the FluAPan and FluAH3 targets were determined and are shown in Table 4.

TABLE 2

| Well | Peak Minimum Thresholding | Midpoint Thresholding | Partial Probability Summation | Direct Probability Distribution |
|------|---------------------------|-----------------------|-------------------------------|--------------------------------|
| 1 | 0.488 | 0.557 | 0.540 | 0.536 |
| 2 | 0.437 | 0.497 | 0.486 | 0.483 |
| 3 | 0.431 | 0.491 | 0.501 | 0.497 |
| 4 | 0.483 | 0.545 | 0.514 | 0.508 |
| 5 | 0.573 | 0.669 | 0.596 | 0.584 |
| % CV | 11.8% | 13.0% | 8.2% | 7.8% |

TABLE 3

| Well | Peak Minimum Thresholding | Midpoint Thresholding | Partial Probability Summation | Direct Probability Distribution |
|------|---------------------------|-----------------------|-------------------------------|--------------------------------|
| 1 | 0.895 | 0.828 | 0.874 | 0.871 |
| 2 | 0.851 | 0.778 | 0.868 | 0.863 |
| 3 | 0.799 | 0.834 | 0.820 | 0.816 |
| 4 | 0.855 | 0.929 | 0.867 | 0.861 |
| 5 | 0.956 | 0.843 | 0.891 | 0.879 |
| % CV | 6.7% | 6.5% | 3.1% | 2.9% |

TABLE 4

| Well | Peak Minimum Thresholding | Midpoint Thresholding | Partial Probability Summation | Direct Probability Distribution |
|------|---------------------------|-----------------------|-------------------------------|--------------------------------|
| 1 | 1.83 | 1.49 | 1.62 | 1.63 |
| 2 | 1.95 | 1.57 | 1.78 | 1.79 |
| 3 | 1.85 | 1.70 | 1.64 | 1.64 |
| 4 | 1.77 | 1.70 | 1.69 | 1.72 |
| 5 | 1.67 | 1.26 | 1.50 | 1.51 |
| % CV | 5.7% | 11.9% | 6.4% | 6.4% |

Figure 7A:
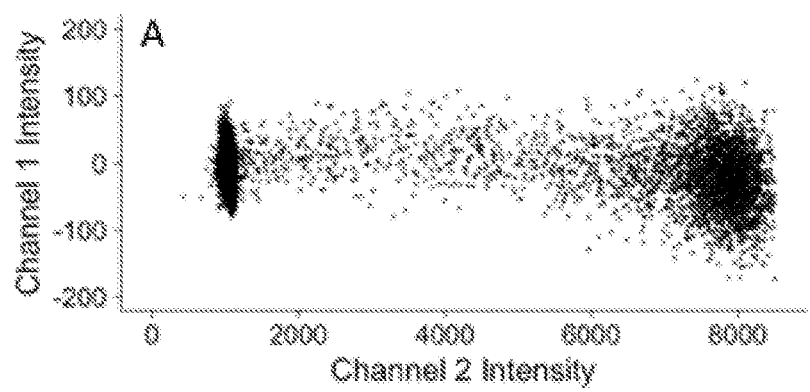
FIGS. 7A-C illustrate an example probe titration experiment resulting in different intensity cluster locations.
Figure 7B:
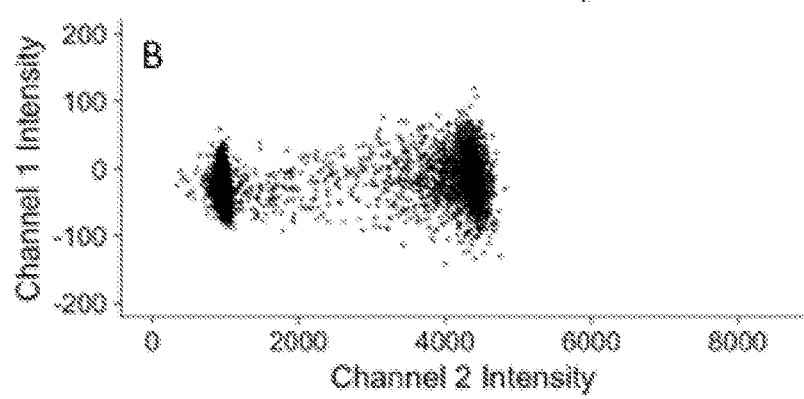
Figure 7C:
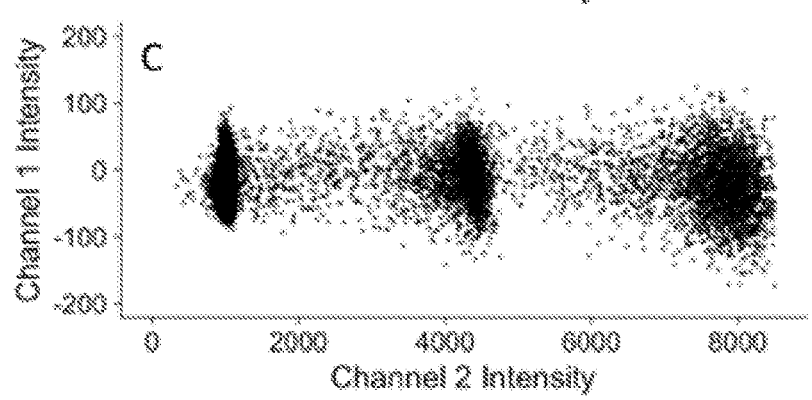

Six wells of a digital PCR assay, each showing a large lower tail (FIG. 7A and FIG. 7B) were combined to form the graph shown in FIG. 7C, and various methods were evaluated for accuracy in determining the original, known count for starting material.

Figure 8:
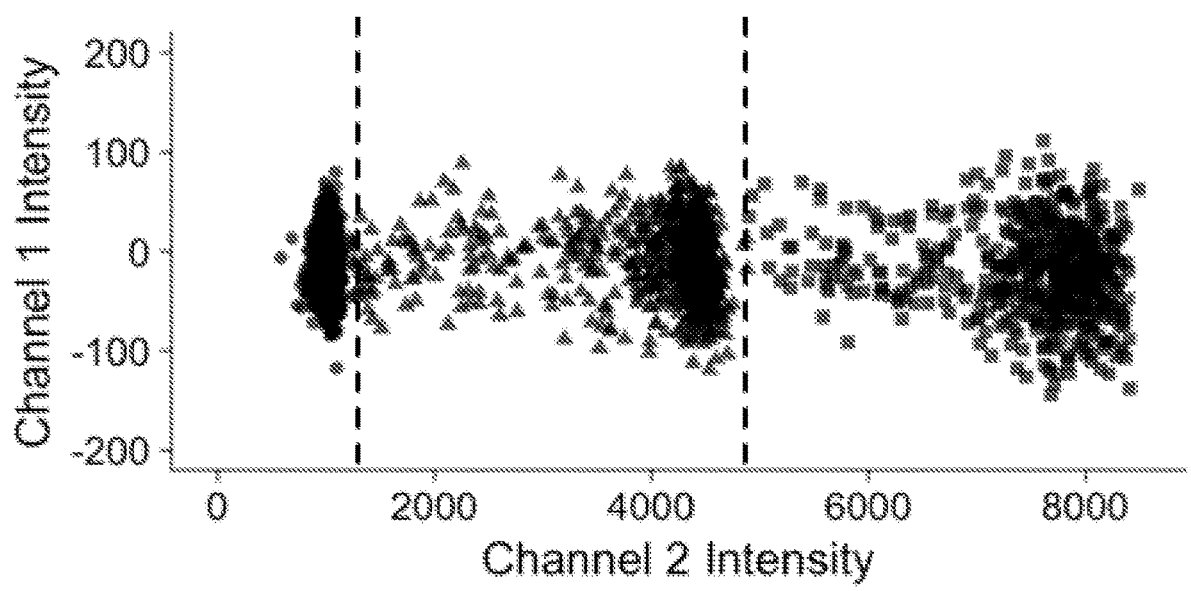
FIG. 8 illustrates a conventional method of determining a threshold in between cluster locations.

A conventional threshold-based method (shown in FIG. 8) was used in combination with modeling the cluster distribution and assigning partial droplet probabilities to each droplet and summing up across all droplets, as in the methods described in Example 1.

Figure 9A:
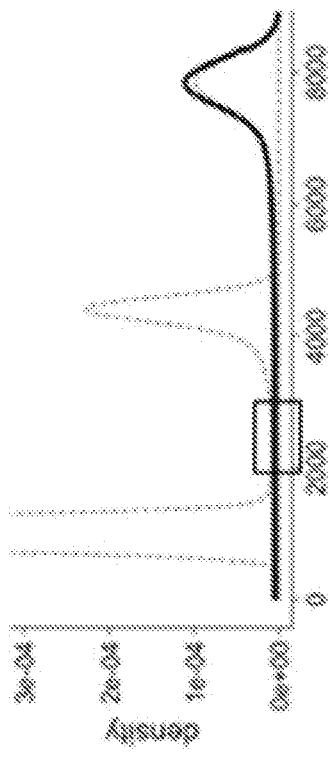
FIG. 9A shows a distribution of droplets in a combined experiment.
Figure 9C:
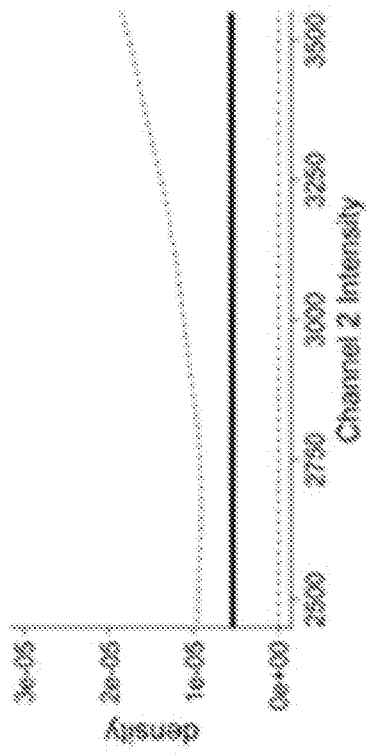
FIG. 9C shows the upper distribution fit to a model (dark line).
Figure 9B:
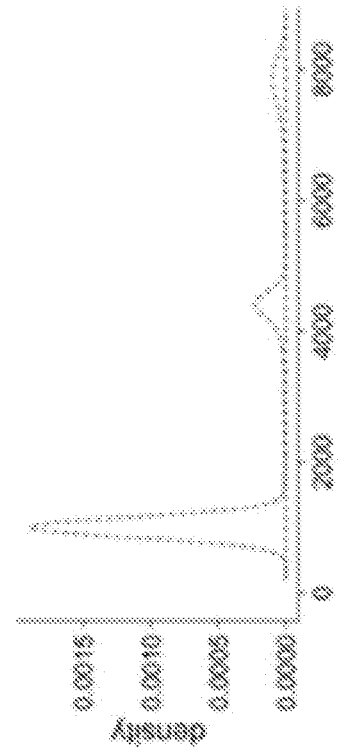
FIG. 9B shows a zoomed in region of the graph of FIG. 9A.
Figure 9D:
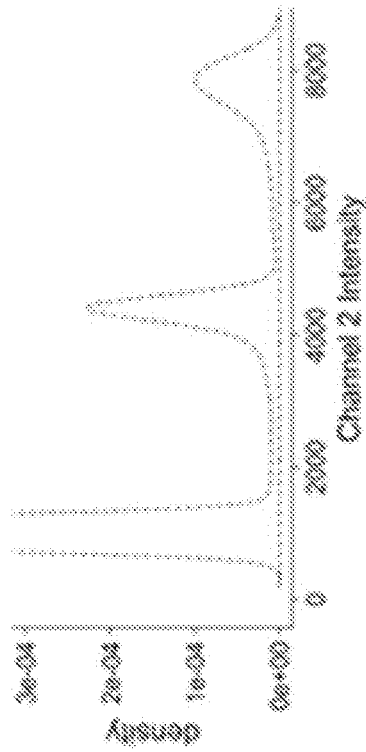
FIG. 9D shows an inset of the graph of FIG. 9C.

FIG. 9A shows a density plot of the data from FIG. 7C. FIG. 9B shows an enlarged y-axis of the plot from FIG. 9A. A non-Gaussian model of the distributions was constructed for the top peak and fitted to the data, as shown in FIG. 9C. An enlarged view is shown in FIG. 9D.

A table for all partitions was generated, with example partitions shown in Table 5. A partial probability was assigned to each parent peak for each partition based on the intensity. The partial probabilities for all partitions were then summed to calculate the estimated copies per droplet associated with each target and a ratio of targets was estimated. In addition, the ratio was also calculated directly from the area under the fitted distributions, without estimating the concentrations of each target. The estimated copies per droplet and ratio of targets are significantly closer to the true source data, as shown in Table 6. The "model" version, using a model to fit the distributions and estimate the sources, is significantly closer in both estimated copies per droplet and target ratio than current standard practice "threshold" method shown in FIG. 8.

TABLE 5

| Partition | Ch2 Intensity | P(1) | P(2) | P(3) |
|---|---|---|---|---|
| 1 | 2750 | 0 | 0.41 | 0.59 |
| 2 | 3000 | 0 | 0.51 | 0.49 |
| 3 | 3250 | 0 | 0.60 | 0.40 |
| Total | 3500 | 0 | 0.68 | 0.32 |

TABLE 6

| Target | True | Threshold | Model |
|---|---|---|---|
| 1 | 0.151 | 0.170 | 0.150 |
| 2 | 0.138 | 0.120 | 0.141 |
| 1:2 | 1.09 | 1.42 | 1.06 |

Example 2—Differentiation of RSVA and Rhinovirus (RhV) by Measuring Target Signal Sums A formulation was constructed for a digital PCR assay such that the fluorescence intensity due to the presence of either target in a droplet on a BioRad CX100 system mapped to the same location on fluorescent channel 1 of the system (FAM). A test was run with wells containing either RSVA synthetic template at approximately 20,000 copies, Rhinovirus (RhV) synthetic template at approximately 20,000 copies, or both.

Figure 10A:
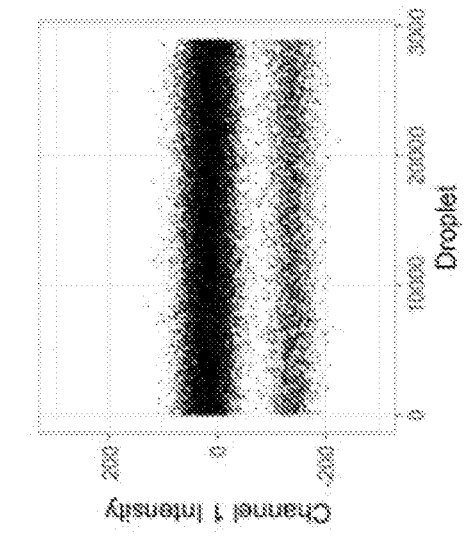
FIGS. 10A-C demonstrate the inability to determine the state of any individual partitions between targets.
Figure 10B:
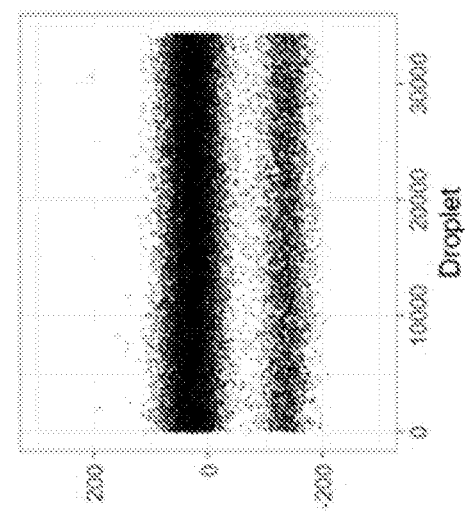
Figure 10C:
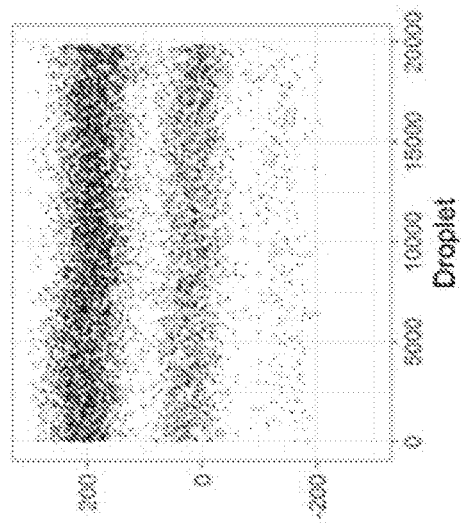

FIG. 10 shows results from this dPCR assay, where droplets either containing targets for RSVA or Rhinovirus both fluoresced at an intensity of 50 fluorescent intensity units, droplets with no targets present fluoresced at −150 fluorescent intensity units, and droplets with both RSVA and Rhinovirus present fluoresced at ~200 fluorescent intensity units. FIG. 11A shows RSVA target centered at 50 fluorescence units in channel 1. FIG. 11B shows Rhinovirus target centered at the same location as RSVA. FIG. 11C shows a graph showing simultaneous presence of both targets. In this case, it is not possible to resolve for a given droplet which virus is present, however it is possible to quantify the total viral load and whether both are present. Table 7 shows the estimated copies per droplet based on analysis of the curves from FIGS. 11A-11C.

TABLE 7

| Target | Copies per Droplet (CPD) |
|---|---|
| RSVA | 1.93 |
| RhV | 1.73 |
| RSVA + RhV | 3.63 |
| Expected RSVA + RhV from singleplex | 3.65 |

Importantly, this method did not include any step of determining the state of any individual partitions, and hence do not include any step of counting any number of partitions. Rather, as set out above, the representative sums were each determined based on a value which was calculated based on the distribution of droplets, and no determination of any partition count was performed. There was approximately a 10% difference between the two targets.

For a frequency of positive counts in each of the three bins in FIGS. 11A-C, F0, F1, F2 and x,y=exp(−λ1) and exp(−λ2).

$$F_0 = xy$$

$$F_1 = x+y-2xy$$

$$F_2 = 1-x-y-xy$$

$$1 = F_0 + F_1 + F_2$$

As F0+F1+F2=1, the equation can be rearranged to:

$$xy = F_0$$

$$x+y = 2F_0 + F_1$$

Accordingly if C=2*F0+F1, the quadratic formula may be used to solve for x and y:

$$x = \frac{1}{2}\left(C + \sqrt{C^2 - 4F_0}\right)$$

$$y = \frac{1}{2}\left(C - \sqrt{C^2 - 4F_0}\right)$$

Figures 12A, 12B:
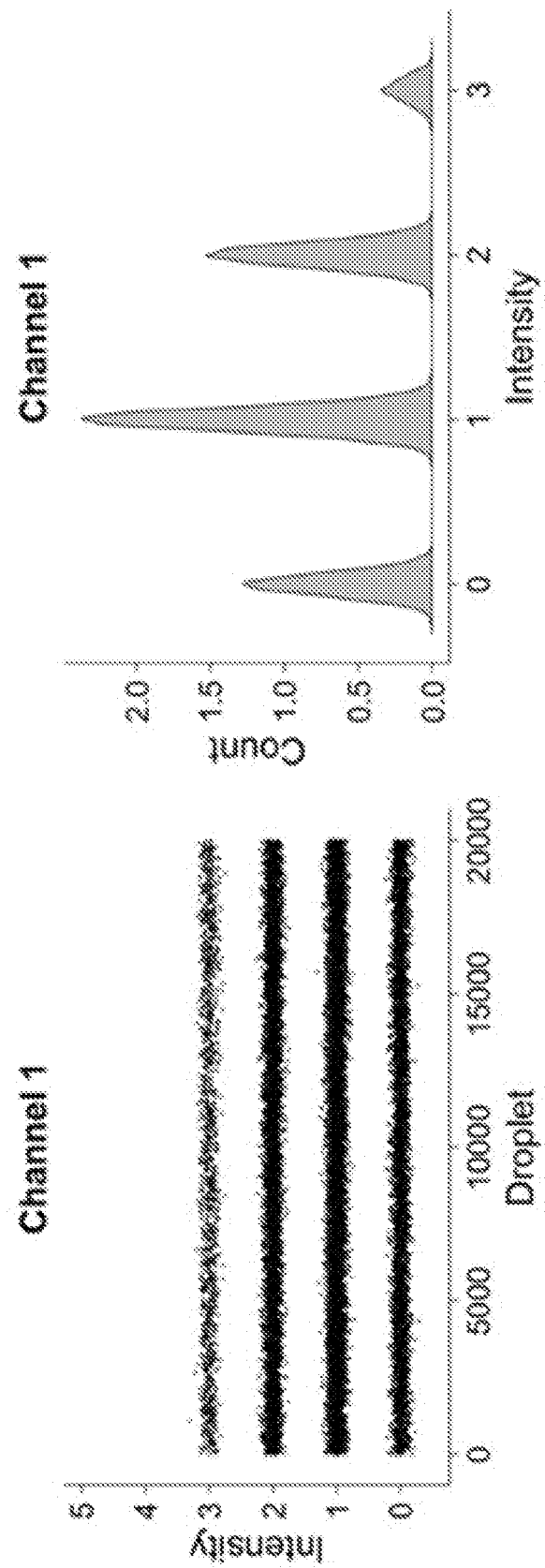
FIGS. 12A-B illustrate the ability to target multiple loci on a single chromosome with a digital PCR assay.

Example 3—Analysis of Multiple Loci on a Single Chromosome Using Digital PCR FIGS. 12A-B show the results of a digital PCR simulation of 3 targets with individual intensity units of "1", with multiple targets being present results in the peaks at higher intensity levels. The simulation consisted of developing 20,000 virtual partitions and randomly assigning each input DNA copy to a partition. For each partition, if a particular 'target' DNA was present after random assignment, an intensity level of "1" was added to the intensity level of the droplet. Thus, if the partition had no DNA, an intensity of "0" was assigned; if there were one or more copies of DNA of only one target, an intensity of "1" was assigned; if there were one or more copies of DNA of two targets, an intensity of "2" was assigned; and if there were one or more copies of all three targets, an intensity level of "3" was assigned. A small, normally distributed amount of noise was added to the intensity for each droplet for east of plotting. In this example, a 'target' refers to each individual intensity-generating probe sequence, however in other cases a target may refer to a larger collection of targets, for example multiple loci on an individual chromosome.

Figure 13B:
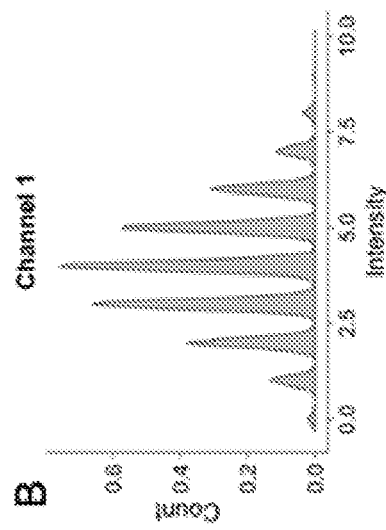
FIGS. 13A-D illustrates the ability to target multiple loci on a single chromosome with a digital PCR assay.
Figure 13D:
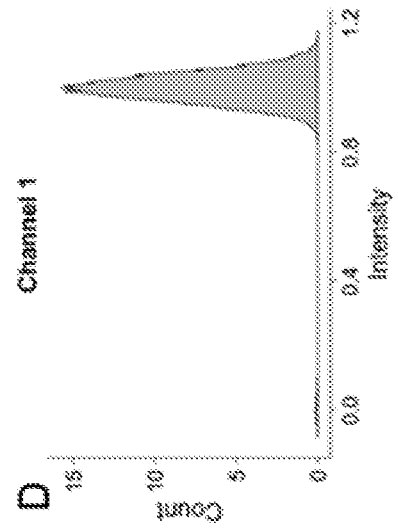
Figure 13A:
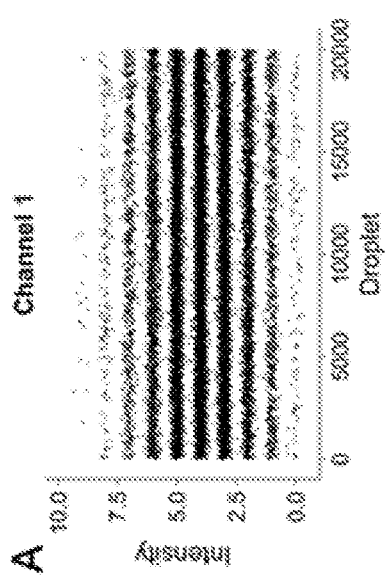

FIGS. 13A-13B show a similar simulation of a digital PCR assay for 10 different loci from a single chromosome. Ten targets at an intensity level of 1 were present and an input copy of 10,000 copies per target were distributed among 20,000 partitions, resulting in partitions that have up to different loci present in any given droplet. A clear and distinct pattern emerged, allowing the calculation of the initial input quantity and 100,000 total counts of positive DNA input.

Figure 13C:
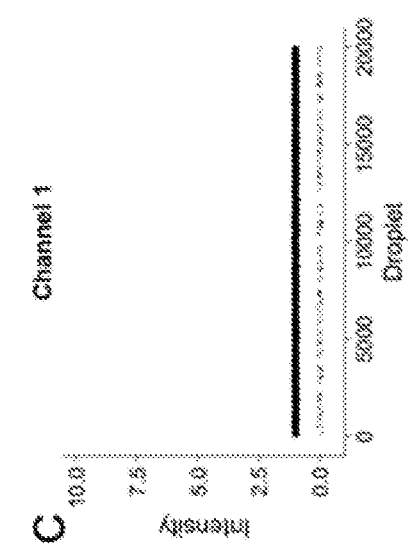

FIGS. 13C-13D show a similar simulation of a digital PCR assay for one target at an intensity level of '1', present at 100,000 copies of input DNA distributed randomly among 20,000 partitions. The majority of partitions were saturated with input DNA, indicating the response of an extra input copy of DNA is not likely to generate a measurable output.

Figure 14:
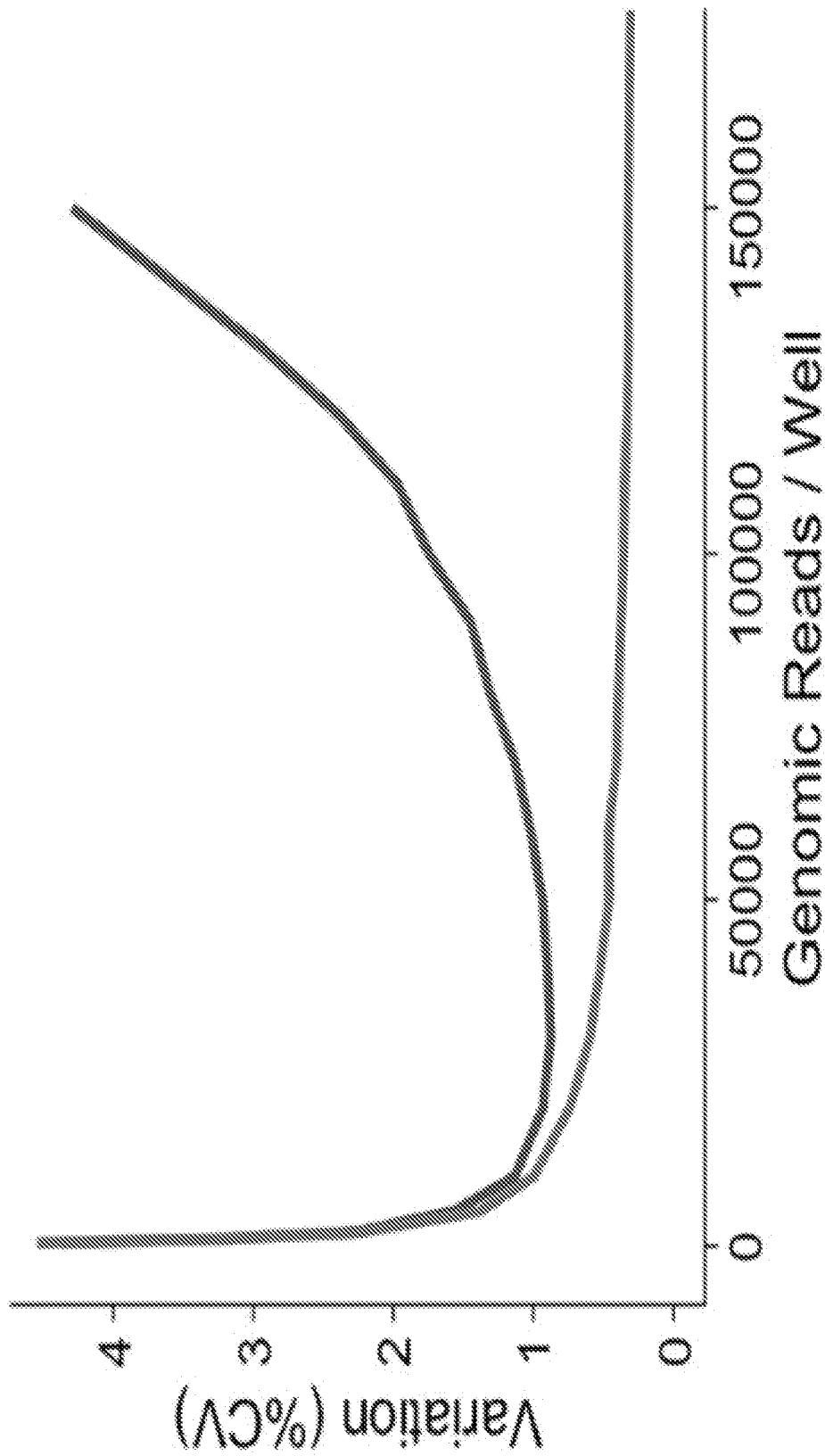
FIG. 14 shows the results of an example digital PCR simulation comparing traditional dPCR with the analysis methods described in Example 3.

FIG. 14 shows a digital PCR simulation, in which DNA was randomly distributed into partitions at different input levels for the two strategies in FIGS. 13A-D. The simulation was run multiple times to generate a coefficient of variation of the measurement of input DNA between trials. The dark gray line indicates the noise in input DNA copy amount as input scales for the current methodology. As the input copy number increases, the noise in the measurement bottomed out at approximately 1% and then began to rise as all partitions saturated with DNA. Using the new method described above, the noise in the quantitative measurement continued to drop with more input DNA, allowing a significant increase in the ability to quantitate at higher levels.

Example 4—Analysis of Multiple Loci on Two Chromosomes Using Digital PCR

FIGS. 15A-C show a digital PCR simulation, similar to that performed Example 3, of basic single channel multiplexing for a single loci on chromosome 18 and a single loci on chromosome 21, showing a different intensity level for each individual target as well as multiple presence.

Figures 16A, 16B, 16C:
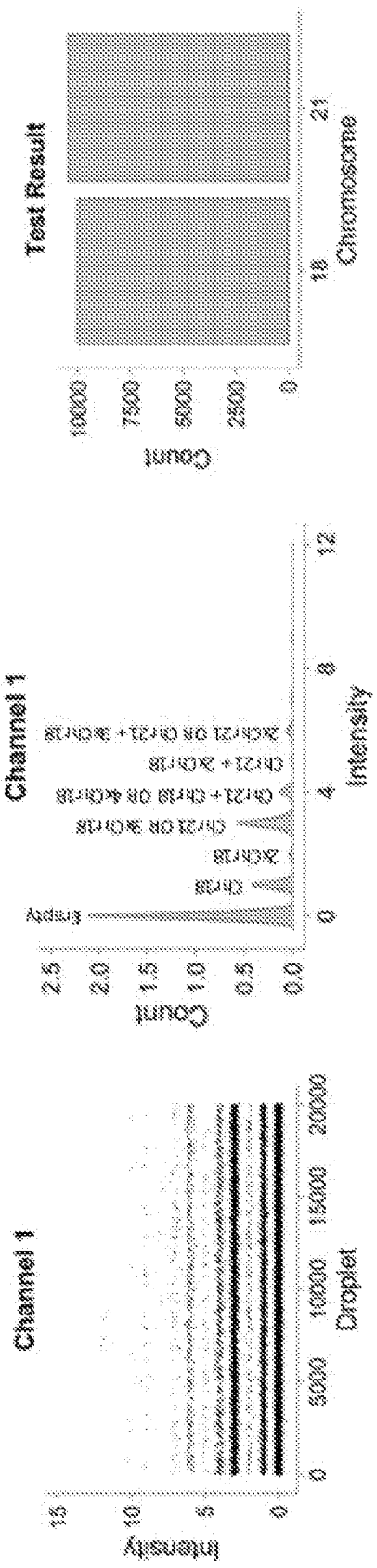
FIGS. 16A-C show an example of multiplexing with digital PCR where multiple chromosomal loci are present.

FIGS. 16A-C show a digital PCR simulation, similar to that performed Example 3, with 4 loci on each of chromosome 18 and chromosome 21. With additional loci each at the intensity levels "1" (for chromosome 18) and "3" (for chromosome 21), secondary bands appear where multiple chromosomal loci are present.

Figures 17A, 17B, 17C:
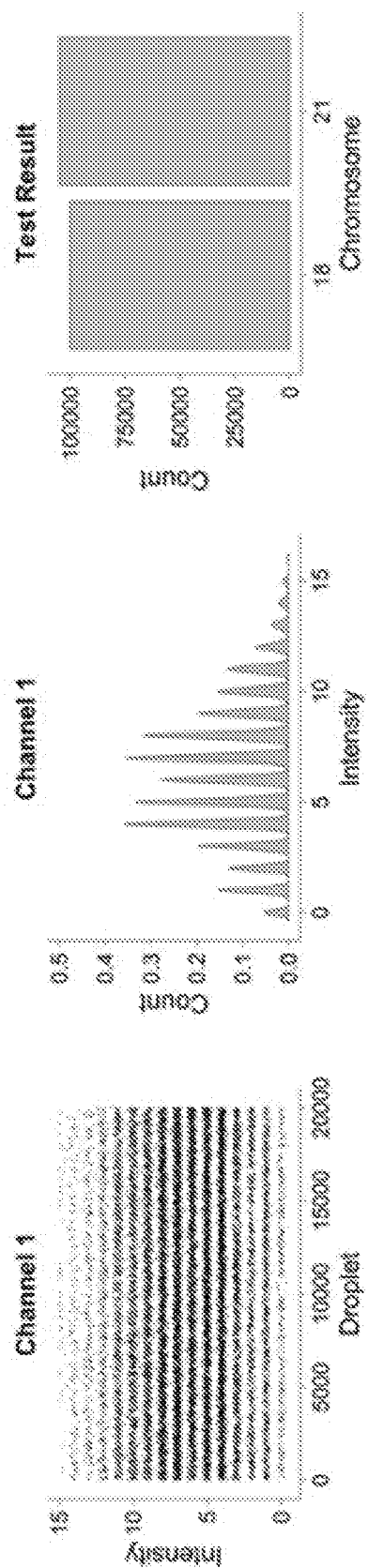
FIGS. 17A-C demonstrate increased sensitivity in multiplexing with digital PCR where multiple chromosomal loci are present.

FIGS. 17A-C show a digital PCR simulation, similar to that performed Example 3, with 4 loci on each of chromosome 18 and chromosome 21.

FIG. 18A shows a digital PCR simulation, similar to that performed Example 3, of four chromosome 18 loci aligned to intensity '1' and four chromosome 21 loci at intensity level '3'.

FIG. 18B shows experimental data from a digital PCR experiment collected using whole genomic DNA on a Bio-Rad QX200. Y axis represents channel intensity and X axis represents droplet width. FIG. 18C shows a digital PCR simulation as in FIG. 18A at 10,000 copies of input genomic DNA. FIG. 18D shows experimental results from a digital PCR experiment at 10,000 copies of input whole genomic DNA. This demonstrates the ability to quantitate 40,000 copies of chromosome 18 and 40,000 copies of chromosome 21 in an approximate 20,000 partition reaction.

Example 5—Analog Input DNA Measurement

Figure 19B:
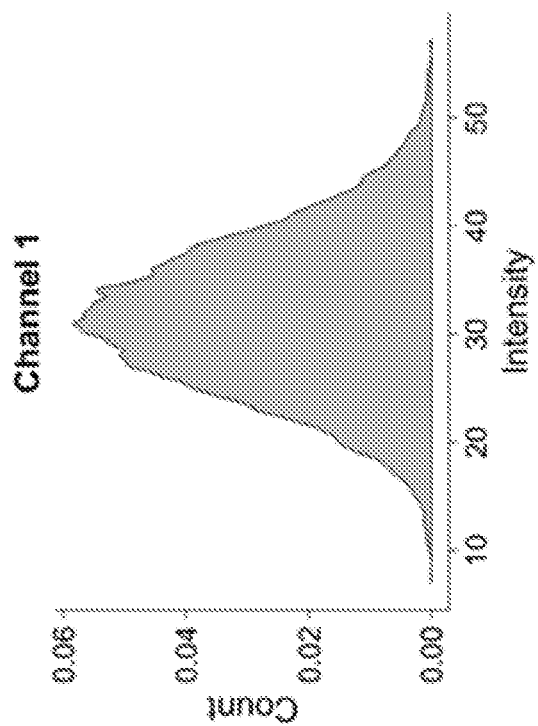
FIGS. 19A-B show the results of an example digital PCR assay simulation described in Example 5.
Figure 19A:
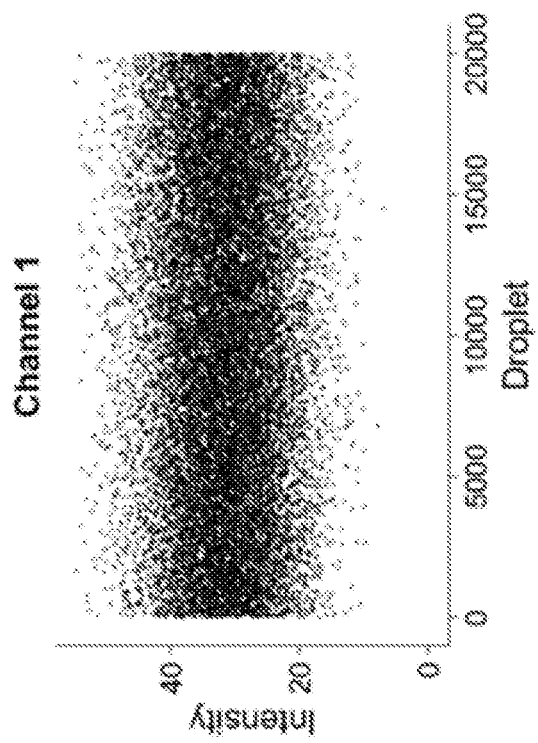

FIGS. 19A-B show a digital PCR assay simulation, as described in Example 4, consisting of 40 targets with an input of 10,000 copies of genomic DNA. This simulation shows a distinct response at 400,000 copies of input DNA.

Example 6—Digital PCR NIPT Assay

Four nucleic acid targets corresponding with chromosome 21 are amplified and the sum signal generated by all four targets is determined, without ever determining the level of any one of the individual targets. In parallel, four targets corresponding with chromosome 18 are amplified and the sum signal generated by all four of these targets is determined without ever determining the level of any one of the individual targets. These two sum signals are then compared, and a ratio is determined. The ratio is used to identify the presence of a fetal aneuploidy from a maternal plasma sample.

The term "about" when referring to a measurable value such as an amount, a temporal duration, and the like, is meant to encompass variations of 20% or in some instances ±10%, or in some instances ±5%, or in some instances ±1%, or in some instances ±0.1% from the specified value, as such variations are appropriate to perform the disclosed methods. Further, "about" can mean plus or minus less than 1 or 1, 2, 3, 4, 5, 6, 7, 8, 9, 10, 11, 12, 13, 14, 15, 16, 17, 18, 19, 20, 25, 30, or greater than 30 percent, depending upon the situation and known or knowable by one skilled in the art. About also includes the exact amount. Hence "about 200 nM" means "about 200 nM" and also "200 nM."

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method of quantifying a nucleic acid target in a sample, the method comprising:
   (a) providing a mixture comprising:
      i. a plurality of nucleic acid molecules derived from, and/or corresponding with, said nucleic acid target; and
      ii. a plurality of oligonucleotide probes, each of which corresponds to a different region of said nucleic acid target;
   (b) partitioning said mixture into a plurality of partitions;
   (c) generating a plurality of signals in said plurality of partitions,
      wherein said plurality of signals are detectable in one color channel, and
      wherein at least one signal of said plurality of signals corresponds with a unique combination of two or more of said plurality of nucleic acid molecules in a partition of said plurality of partitions;
   (d) detecting from multiple partitions of said plurality of partitions said plurality of signals in said color channel;
   (e) using said plurality of signals detected in step (d) to determine, for said plurality of partitions, a plurality of probabilities that one or more nucleic acid molecules of said plurality of nucleic acid molecules is present in a given partition, thereby generating a plurality of probabilities; and
   (f) quantifying said nucleic acid target in said sample based at least on a function of said plurality of probabilities,
      wherein said method is performed without determining a number of partitions comprising a nucleic acid sequence corresponding to said nucleic acid target.

2. The method of claim 1, wherein at least a portion of said plurality of signals is generated by said plurality of oligonucleotide probes.

3. The method of claim 1, wherein said sample further comprises (iii) an additional plurality of nucleic acid molecules derived from, and/or corresponding with, an additional nucleic acid target and (iv) an additional plurality of oligonucleotide probes, each of which corresponds to a different region of said additional nucleic acid target.

4. The method of claim 3, wherein at least a portion of said plurality of signals is generated by said plurality of oligonucleotide probes and said additional plurality of oligonucleotide probes.

5. The method of claim 1, wherein said sample comprises blood or plasma.

6. The method of claim 1, wherein said nucleic acid target is a chromosome.

7. The method of claim 6, wherein said chromosome is chromosome 21, chromosome 18, chromosome 15, chromosome 13, an X chromosome, or a Y chromosome.

8. The method of claim 1, wherein (c) comprises amplifying said plurality of nucleic acid molecules, thereby generating said plurality of signals.

9. The method of claim 8, wherein said amplifying degrades said plurality of oligonucleotide probes, thereby generating said plurality of signals.

10. The method of claim 1, wherein said plurality of signals is a plurality of fluorescent signals or a plurality of chemiluminescent signals.

11. The method of claim 1, wherein said plurality of oligonucleotide probes each bind to a different region of said nucleic acid target.

12. The method of claim 1, wherein said at least one of said plurality of signals uniquely corresponds with a presence of exactly two of said plurality of nucleic acid molecules in said partition.

13. The method of claim 1, wherein at least one signal of said plurality of signals corresponds with two or more unique combinations of said plurality of nucleic acid molecules.

14. The method of claim 13, wherein said at least one signal of said plurality of signals (A) corresponds with a presence of one of said plurality of nucleic acid molecules and (B) corresponds with a presence of two of said plurality of nucleic acid molecules.

15. The method of claim 1, wherein said method is performed without determining a number of nucleic acid molecules in any individual member of said plurality of partitions.

16. The method of claim 1, wherein said function is a sum.

17. The method of claim 1, wherein the method is performed without determining a number of partitions which comprise two or more of said plurality of nucleic acid molecules.

* * * * *